United States Patent [19]
Sugiyama et al.

[11] Patent Number: 6,002,403
[45] Date of Patent: *Dec. 14, 1999

[54] GRAPHICAL NAVIGATION CONTROL FOR SELECTING APPLICATIONS ON VISUAL WALLS

[75] Inventors: Takashi Sugiyama, Sunnyvale; Brian Bakoglu, Milpitas; Hiroaki Nakano, San Francisco; George Cossey, San Jose, all of Calif.

[73] Assignees: Sony Corporation, Tokyo, Japan; Sony Electronics Inc., Park Ridge, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/664,654

[22] Filed: Jun. 17, 1996

Related U.S. Application Data

[60] Provisional application No. 60/017,066, Apr. 30, 1996, provisional application No. 60/017,069, May 1, 1996, provisional application No. 60/017,078, Apr. 30, 1996, and provisional application No. 60/018,596, Apr. 30, 1996.

[51] Int. Cl.[6] .................................................. G06F 3/00
[52] U.S. Cl. ........................ 345/355; 345/327; 345/976; 345/978; 345/346; 345/342
[58] Field of Search ..................................... 395/326–358

[56] References Cited

U.S. PATENT DOCUMENTS

| | | | |
|---|---|---|---|
| 4,890,098 | 12/1989 | Dawes et al. | 340/721 |
| 4,914,607 | 4/1990 | Takanashi et al. | 364/521 |

(List continued on next page.)

FOREIGN PATENT DOCUMENTS

| | | | |
|---|---|---|---|
| 0547993A2 | 6/1993 | European Pat. Off. | G06F 3/033 |
| 0547993A3 | 6/1993 | European Pat. Off. | G06F 3/033 |
| 7-02401 | 7/1995 | Japan | G06F 3/14 |

OTHER PUBLICATIONS

PCT Application US97/0721 search report, Jul. 28, 1997.
PCT Application US97/07025 search report, Sep. 30, 1997.
PCT Application US97/07023 search report, Jul. 28, 1997.
50K1440.01—An Apparatus and Method for Providing a Graphical User Interface with a Three–Dimensional Icon (As Amended), Serial No: 08/664,652, Filing Date: Jun. 17, 1996, Inventors: H. Nakano et al.
50K1441.01—Display Control Method and Apparatus, Serial No.:08/664,773, Filing Date: Jun. 17, 1996, Inventors: H. Nakano et al.

(List continued on next page.)

*Primary Examiner*—John E. Breene
*Attorney, Agent, or Firm*—Jerry A. Miller; Pasquale Musacchio

[57] ABSTRACT

A graphical user interface displays a first menu image on a display for an operating system on a computer. The first menu image includes a taskbar image which carries button images selectable by the user to carry out a function. The GUI also displays a second menu image on the display for a navigator software which is running under the operating system. The navigator software provides a quasi-operating system environment. The GUI displays the taskbar image in the second menu image whereby the user can carry out functions of the operating system from within the quasi-operating system environment provided by the navigator software. Three visual walls are arranged on the GUI as if the user is standing inside a three-dimensional cube and open to the sky. Clicking once either on the side walls moves the contents of the side wall to the center, in effect rotating the cube. When a wall is centered, the user can activate any function in the wall by clicking on a button. Buttons displayed in the side wall may be immediately activated by double clicking so the user does not have to center the side wall.

5 Claims, 26 Drawing Sheets

U.S. PATENT DOCUMENTS

| | | | |
|---|---|---|---|
| 5,001,697 | 3/1991 | Torres | 364/521 |
| 5,046,001 | 9/1991 | Barker et al. | 364/200 |
| 5,204,947 | 4/1993 | Bernstein et al. | 395/157 |
| 5,295,243 | 3/1994 | Robertson et al. | 395/160 |
| 5,303,388 | 4/1994 | Kreitman et al. | 395/355 |
| 5,339,390 | 8/1994 | Robertson et al. | 395/355 X |
| 5,381,158 | 1/1995 | Takahara et al. | 345/156 |
| 5,452,414 | 9/1995 | Rosendahl et al. | 395/159 |
| 5,485,197 | 1/1996 | Hoarty | 395/355 X |
| 5,524,195 | 6/1996 | Clanton, III et al. | 395/155 |
| 5,555,354 | 9/1996 | Strasnick et al. | 395/355 X |
| 5,602,997 | 2/1997 | Carpenter et al. | 395/349 |
| 5,608,850 | 3/1997 | Robertson | 395/355 X |
| 5,617,526 | 4/1997 | Oran et al. | 395/348 X |
| 5,621,906 | 4/1997 | O'Neill et al. | 395/355 |

OTHER PUBLICATIONS

50K1439.03—User Interface for Displaying Windows on a Rectangular Parallelepiped (As Amended), Serial No.: Unknown (Parent S/N 08/664,650) Filing Date: Nov. 4, 1997 Inventors:T. Sugiyama et al.

50K1442.01—Menu Display Interface with Miniature Windows Corresponding to Each Page (As Amended), Serial No.: 08/664,651, Filing Date: Jun. 17, 1996, Inventors: H. Nakano et al.

IBM Systems Application Architecture, "Common User Access Advanced Interface Design Guide," First Edition, Jun., 1989, pp. 59–61 and 103–105.

Microsoft Windows V 3.11, Screen Dumps, pp. 1–4.

| REF. NO. | DESCRIP. |
|---|---|
| 111 | VIDEO WALL |
| 112 | A/V WALL |
| 113 | APPLICATION WALL |
| 141 | NET SPACE WALL |

| REF. NO. | DESCRIP. |
|---|---|
| 111 | VIDEO WALL |
| 112 | A/V WALL |
| 113 | APPLICATION WALL |
| 141 | NET SPACE WALL |

| REF. NO. | DESCRIP. |
|---|---|
| 111 | VIDEO WALL |
| 112 | A/V WALL |
| 113 | APPLICATION WALL |
| 141 | NET SPACE WALL |

| REF. NO. | DESCRIP. |
|---|---|
| 111 | VIDEO WALL |
| 112 | A/V WALL |
| 113 | APPLICATION WALL |
| 141 | NET SPACE WALL |

| REF. NO. | DESCRIP. |
|---|---|
| 111 | VIDEO WALL |
| 112 | A/V WALL |
| 113 | APPLICATION WALL |
| 141 | NET SPACE WALL |

| REF. NO. | DESCRIP. |
|---|---|
| 111 | VIDEO WALL |
| 112 | A/V WALL |
| 113 | APPLICATION WALL |
| 141 | NET SPACE WALL |

GRAPHICAL NAVIGATION CONTROL FOR
SELECTING APPLICATIONS ON VISUAL
WALLS

CROSS REFERENCE TO RELATED APPLICATION

This application claims the benefit of (1) U.S. Provisional Application No. 60/017,066, filed on Apr. 30, 1996, entitled "USER INTERFACE FOR NAVIGATING AMONG, ORGANIZING AND EXECUTING PROGRAMS, FILES AND DATA IN A . . .", (2) U.S. Provisional Application No. 60/017,069, filed on May 1, 1996, entitled "DISPLAY CONTROL METHOD AND APPARATUS", (3) U.S. Provisional Application No. 60/017,078, filed on Apr. 30, 1996, entitled "DISPLAY CONTROL METHOD AND APPARATUS", (4) U.S. Provisional Application No. 60/018,596, filed on Apr. 30, 1996, entitled "DISPLAY CONTROL METHOD AND APPARATUS", inventors being Hiroaki Nakano, Takashi Sugiyama, Halil Bakoglu, George Cossey and Koji Matsuoka, all of which are hereby incorporated by reference.

BACKGROUND OF THE INVENTION

This invention relates to a graphical user interface and more particularly, relates to a graphical user interface wherein a desired command can be quickly and certainly input.

Recently, as a computer has higher capability, there has become popular a graphical user interface (GUI) which displays graphical images (so-called icons) corresponding to functions and/or programs to be executed. The GUI enables a user to point a desired icon by using a pointing device such as a mouse, so that a desired program is selected and executed. Therefore, the user need not memorize commands to execute a program and even a beginner user has become able to operate a computer easily.

Among the most generally used GUI currently, there is known a multi-window system for providing plural independent display areas (windows) in a two-dimensional display. For example, WINDOWS (trademark) by Microsoft Corp. is an example of such a system. In this multi-window system, a window called a folder is provided for each category and each icon is displayed in a folder of the corresponding category. However, positions where these windows (folders) are displayed are not necessarily specified. Therefore, a window is sometimes hidden behind other windows. When the user cannot recognize the hidden window, he cannot quickly select a desired window.

To resolve this kind of problem, it is possible to provide a new graphical user interface. However, providing a completely different operating system to provide such a new GUI would confuse users who want to have a common operating system with other users. Therefore, it is preferable to provide a application software which can display a new GUI. Such an application software must not a new operating system but a mere application software which can run under the currently available operating system.

SUMMARY OF THE INVENTION

This invention is made in light of this situation and provides a new type of three-dimensional graphical user interface which enables the user to intuitively recognize menus arranged in a three-dimensional space so that the user can quickly and certainly input a command by using the menu.

In accordance with the present invention, there is provided a graphical user interface which displays a first menu image on a display for an operating system of a computer. The first menu image includes a taskbar image which carries button images selectable by a user to carry out corresponding function. The GUI also displays a second menu image on the display for a navigator software which is running under the operating system. The navigator software provides a quasi-operating system environment. The GUI displays the taskbar image in the second menu image whereby the user can carry out functions of the operating system from within the quasi-operating system environment provided by the navigator software.

DESCRIPTION OF THE PREFERRED EMBODIMENTS

Figure 1:
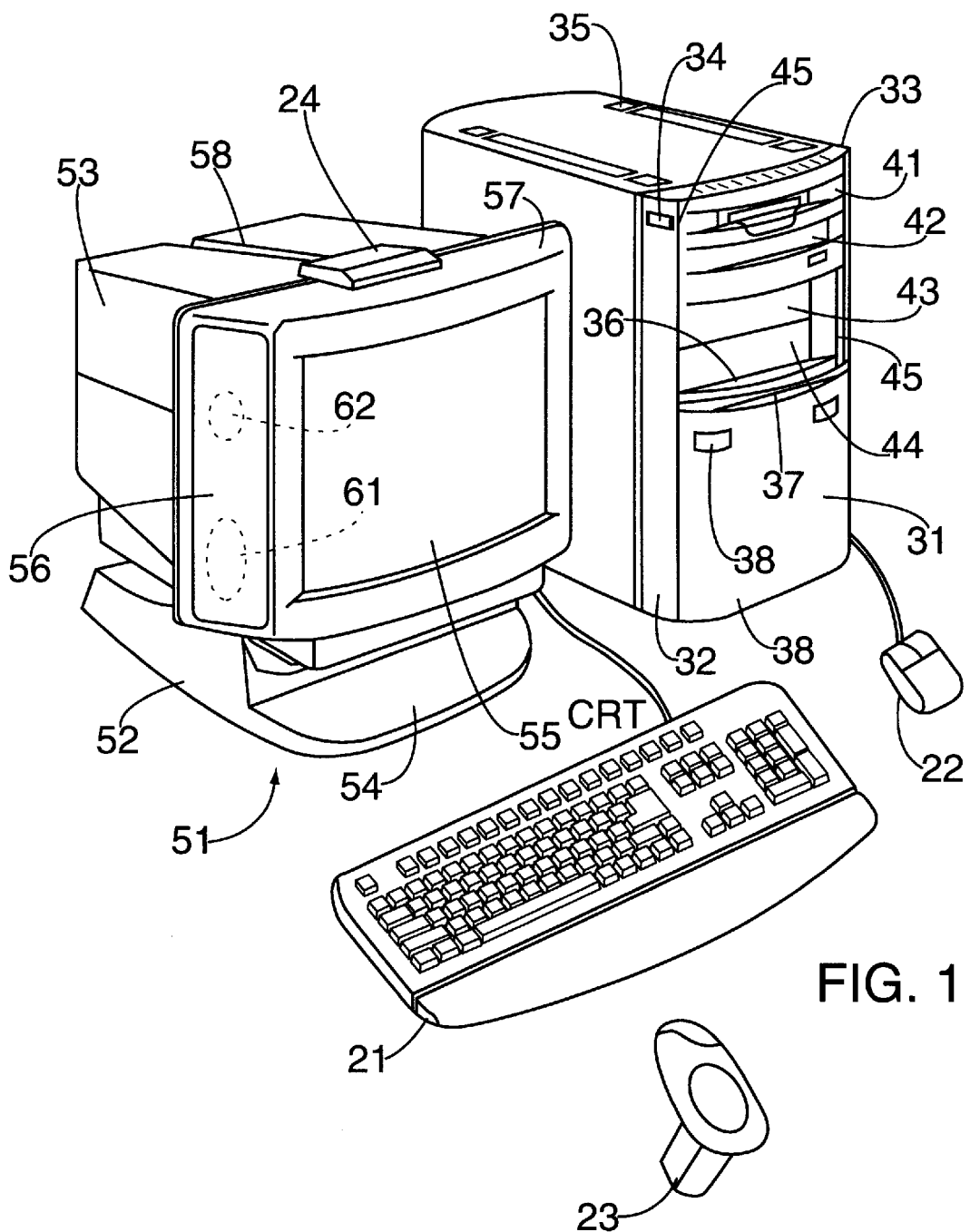
FIG. 1 is a perspective drawing for showing an example of a personal computer system to which a graphical user interface according to the present invention applies.

FIG. 1 shows a construction of a personal computer system to which a graphical user interface according to the present invention applies. As shown in FIG. 1, the personal computer system has main body 31, keyboard 21 and mouse 22 operable to input a command to main body 31, and display 51 for displaying an image.

Main body 31 has a dimension of 225 mm width, 373 mm height and 430 mm depth. At the corners between the front face and the two side faces of main body 31, there are provided with tapered faces 32 and 33 so that the width of main body 31 looks narrow. On the upper portion of one tapered face 32 of the two, there is provided with power switch 34 operable to turn on/off a power supply to main body 31. On the top face of main body 31, there are provided with four recesses 35 at locations corresponding to legs of a peripheral device so that when the peripheral device is placed on main body 31 the legs of the peripheral device are stably arranged on the top face of main body 31.

On the front face of main body 31, lower panel 36 and upper panel 37 are provided. Lower panel 36 is forced to protrude outward by a spring (not shown). The user can push lower panel 36 against the force of the spring so as to make lower panel 36 depressed toward main body 31. Upper panel 37 is guided by left and right guides 45 to be slidable upward and downward. The downward movement of upper panel 37 is restricted when lower panel 36 is protruding.

When the user wants to use the computer system, he pushes lower panel 36 toward main body 31 against the force of the spring to make lower panel 36 depressed. Then, the restriction of the downward movement of upper panel 37 is removed so that upper panel 37 can move downward along guides 45. Consequently, as shown in FIG. 1, FD (floppy disk) drive 41 and CD-ROM drive 42 which are built in main body 31 become exposed and available to the user. In addition, main body 31 is provided with two expansion slots 43 and 44 so that other devices can be attached thereto.

When the user stops using it, he puts his fingers on recess 38 provided on the upper portion of upper panel 37 and moves upper panel 37 upward. When upper panel 37 has moved upward to a certain position along guides 45, lower panel 36 comes to protrude outward in accordance with the force of the spring and restricts the downward movement of upper panel 37. When main body 31 is not in use, the inside devices are not exposed by closing upper panel 37 so that flat and simple design image is achieved. Anticipating that a computer system is developed and merged into an AV device in the future, upper panel 37 is designed such that it can be modified to a drawer type or rotating type.

Display 51 basically comprises pedestal 52 and display portion 53 which is connected to pedestal 52 moveably in a horizontal direction (pan direction) and in a vertical direction (tilt direction). CRT 55 is arranged at the front of display portion 53. Speakers 61 and 62 are arranged inside left and right tapered faces 56 and 57 of display portion 53.

Groove 58 is provided at the center of the top face of display portion 53. In a situation where infrared ray receiver 24 for receiving infrared rays emitted from IR commander 23 is attached on the top face of display portion 53, a cord of infrared ray receiver 24 can be embedded in groove 58 for cable disposal. As IR commander 23 is moved in the up/down and left/right directions, infrared ray receiver 24 detects the movement and supplies a detection signal to main body 31. Main body 31 detects the operation of IR commander 23 from the detection signal and moves a cursor on CRT 55 in accordance with the detection signal. Instead of receiving the cord of infrared ray receiver 24, groove 58 of display 51 may receive a cord of other device such as a television camera which is put on display 51 to constitute a television phone.

Figure 2:
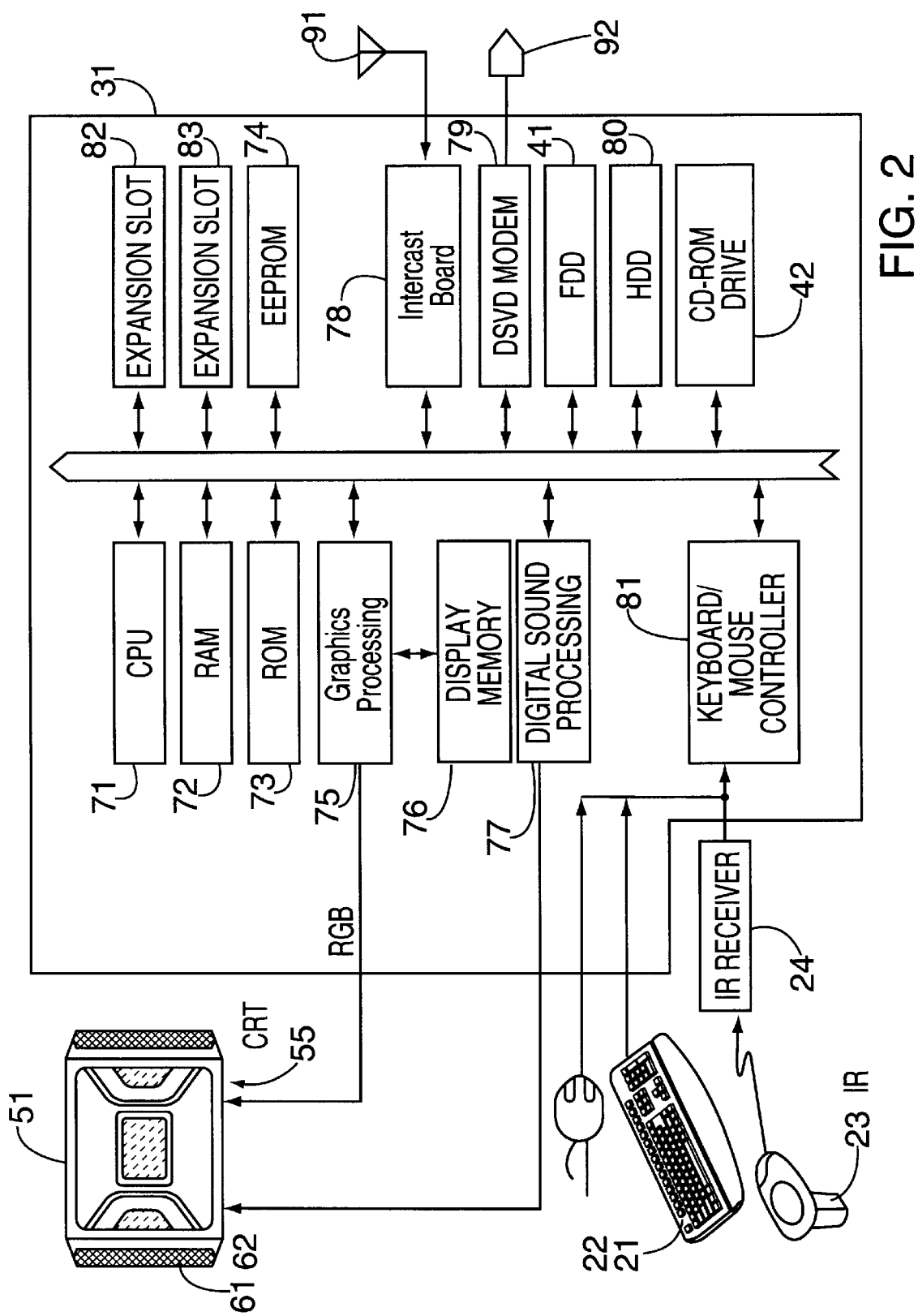
FIG. 2 is a block diagram for showing an example of internal construction of main body 31 shown in FIG. 1.

FIG. 2 shows an example of the inside of main body 31. For example, PENTIUM (trademark) by Intel Corp. is used as CPU (Central Processing Unit) 71. This CPU operates in accordance with an internal clock of 166 MHZ or an external clock of 66 MHZ. RAM 72 is a main memory of 16 MB to store data and program to be processed by CPU 71. ROM 73 stores a program necessary for CPU 71 to execute various processes. EEPROM (Electrically Erasable Programmable Read Only Memory) 74 stores data which need to be stored even after a power supply to main body 31 is turned off.

Graphics processing portion 75 handles a moving picture processing (color space transformation for transforming YUV signals which is a display format for moving picture data, to RGB signals which is a format for graphics data; scaling (enlarging or reducing) for displaying in a desired image size; or processing for displaying an MPEG (Moving Picture Experts Group) image as a full screen moving picture of 30 frames/s). Graphics processing portion 75 also handles a three-dimensional graphics processing (e.g. a rasterizing process for projecting a three-dimensional object onto a two-dimensional image plane; a glow-shading processing for making a surface of an object look smooth; or an alpha-blending processing for describing a half-transparent object). In addition, graphics processing portion 75 writes results of the processing in display memory 76, transforms them to analogue RGB signals and outputs them to display 51.

Digital sound processing portion 77 carries out expansion of ADPCM (Adaptive Difference Pulse Code Modulation) sound source, expansion of MPEG audio data, generation of sound effect such as reverberation and surrounding, FM (Frequency Modulation) sound synthesis (that is, a process for generating an audio signal by synthesizing plural sine waves of different frequencies and amplitudes) or MIDI (Musical Instrument Digital Interface) wave table synthesis process. The MIDI wave table synthesis process is a process for reproducing MIDI data by a built-in synthesizer with a wave table for storing digital data which are phonemes of various musical instruments. Each processed audio signal is mixed by a built-in audio mixer, transformed into an analogue audio signal and supplied to speakers 61 and 62 of display 51.

INTERCAST (trademark) board 78 receives INTERCAST broadcast signals through antenna 91 and demodulates them. In the INTERCAST, HTML (Hyper Text Markup Language) data, which is a basis of World Wide Web (WWW) page, is inserted into vertical blanking periods of a video signal and transmitted. The received data is stored in hard disk drive (HDD) 80. The user can obtain a pseudo interactive environment by accessing HTML data back and forth in hard disk drive 80. For example, in the case of a sport program, scores, still pictures of crucial scenes, video clips and so on are transmitted by the INTERCAST in accordance with contents of programs. These still pictures and video clips are linked with relevant information. For example, it is possible to access a source of the relevant information through an analogue telephone line and to obtain the relevant information. The INTERCAST has been developed by Intel Corp.

DSVD (Digital Simultaneous Voice & Data) modem 79 time-division multiplexes voice and data in DSVD format developed by Corp., and outputs them to a telephone line via modular jack 92. DSVD modem 79 also demodulates and separates an input signal of DSVD format, which signal is input via a telephone line, into a voice signal and data. In this format, digital-compressed audio signals and ordinary data signals are multiplexed by the use of a header of V.42 protocol. If there is no audio signal, the maximum data transfer rate is 28.8 k bits/s. If there is an audio signal, the maximum data transfer rate is 19.2 k bits/s and the transfer rate of the audio signal is 9.6 k bits/s. As a method for compressing and expanding audio signals, DIGITALK (trade mark) by Rockwell, TrueSpeech (trademark) by DSP Group and so on may be used.

Floppy disk drive device 41 can drive a 3.5 inch floppy disk and can read and write data from and on floppy disks of three formats; 1.44 MB, 1.2 MB and 720 kB. Hard disk drive 80 reads and writes data from and on a hard disk having 1.6 GB storage capacity. CD-ROM drive 42 drives a CD-ROM at the 4 times speed of CD (compact disk).

Keyboard/mouse controller 81 carries out an interface function between keyboard 21 and CPU 71 or between mouse 22 and CPU 71. Keyboard/mouse controller 81 also receives an output of infrared ray receiver 24 and outputs corresponding signals to CPU 71.

Although a single bus is shown in FIG. 2 for the purpose of simplification, it actually comprises a local bus for connecting the CPU and RAM 72, an ISA (Industry Standard Architecture) bus connected to keyboard/mouse controller 81 and a PCI (Peripheral Component Interconnect) bus to which ROM 73 to HDD 80, FDD 41, CD-ROM drive 42 and so on are connected. The ISA bus is a bus of 8 bits or 16 bits. The PCI bus is a bus of 32 bits or 64 bits. The PCI bus operates at the speed between 25 MHz and 66 MHz and achieves a throughput of 528 KB/s at the maximum. This speed is more than 42 times faster than that of the ISA bus.

Expansion slot 82 is one for the PCI bus and expansion slot 83 is one for the ISA bus. A peripheral circuit of any desired function (for example, a SCSI board and DVD (Digital Versatile Disc) player) can be connected to these expansion slots. Between the local bus and the PCI bus, and between the PCI bus and the ISA bus, there are provided with exclusive bus bridge circuits (not shown), respectively.

Figure 3:
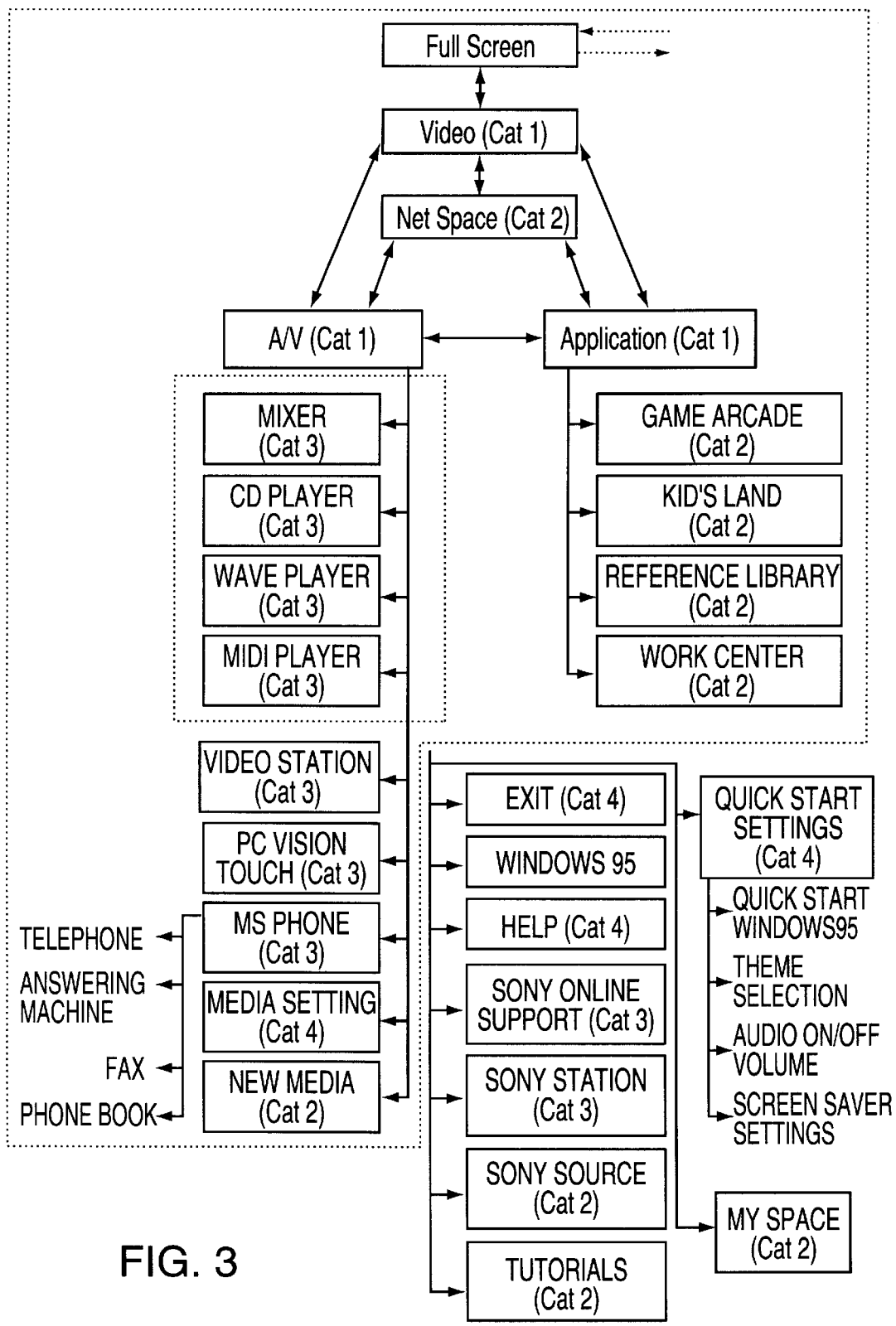
FIG. 3 is a drawing for explaining transitions of display screens of display 51 shown in FIG. 1.

In a preferred embodiment, a graphical user interface according to the invention is displayed by a "navigator" software which operates under the WINDOWS 95 (trademark) operating system manufactured by Microsoft Corp. FIG. 3 shows transition of menu screens of the graphical user interface. As shown in FIG. 3, a menu image of each level belongs to one of four categories (levels). Category 1 displays the first level menus and has buttons of categories 2 to 4 therein which will be later explained. When the buttons are clicked, the first level menu goes to second level menus (Category 2) corresponding to the clicked button. Category 2 is a Application folder for registering application software. An icon of each application software is displayed in Category 2 (the Application folder). Category 3 shows application software which is of the third level. Category 4 shows a pop up dialogue box or a temporary window for setting and displaying.

Figure 4A:
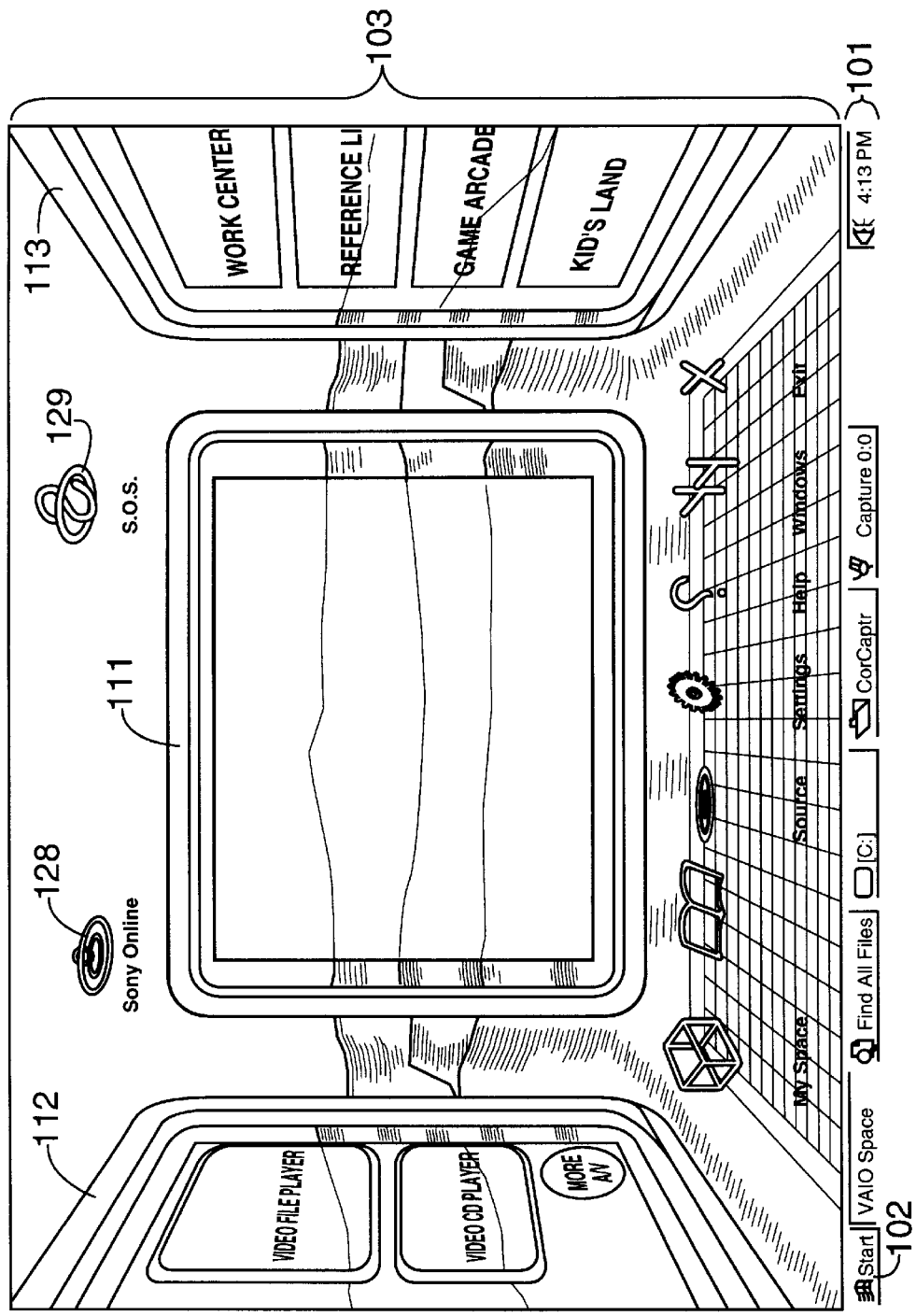
FIGS. 4A and 4B show a display example in the Video mode.
Figure 4B:
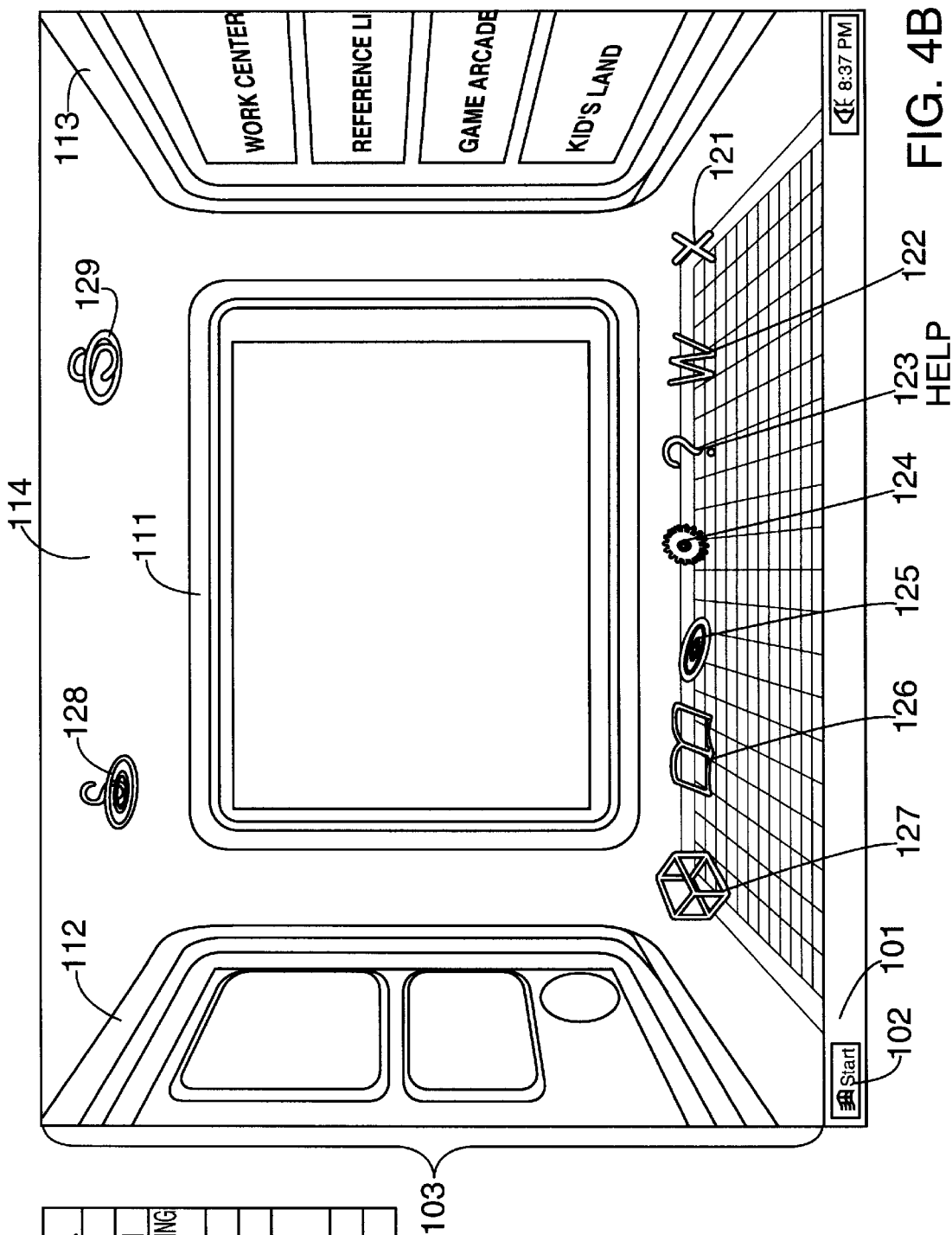

In this embodiment, four screen modes are basically provided as menu screens to select certain functions (icons). One of them is Video mode in which Video Wall 111 is displayed in the center, as shown in FIG. 4A. Video Wall 111 may be a transparent screen so that a background image can be seen through it. On this transparent screen, a certain moving picture image (not shown in FIG. 4A) is displayed as the user chooses. For the convenience of explanation of the drawing, FIG. 4B is also provided to show the same as FIG. 4A except that the background image is removed.

When a screen saver mode is turned on, if the user does not input anything by using keyboard 21 or mouse 22 within a predetermined certain period after Video Wall 111 is displayed, the display is changed to a full screen video condition. In the full screen video condition, the moving picture image displayed in Video Wall 111 will be expanded onto an entire screen of display 51. The screen saver function inhibits printing of an image on CRT 55 of display 51. The user can also intentionally select the full screen video. When the user clicks Video Wall 111 by operating mouse 22, the video screen changes to the full screen video.

As shown in FIG. 4A, in the Video mode, Video Wall 111 is displayed at the center of the screen, a portion of A/V Wall 112 is displayed on the left and a portion of Application Wall 113 is displayed on the right. These three walls are arranged as if the user is standing inside a cube that shows three walls and is open to the sky. Clicking once either of the side walls moves the contents of that side wall to the center, in effect rotating the cube. When the wall is at the center, the user can activate any function in that wall by clicking a corresponding button once. Alternatively, when the user double-clicks any button in the side wall, a function corresponding to the double-clicked button is immediately activated. In this case, the user does not have to wait until the side wall moves first to the center by clicking the side wall once.

Figure 5:
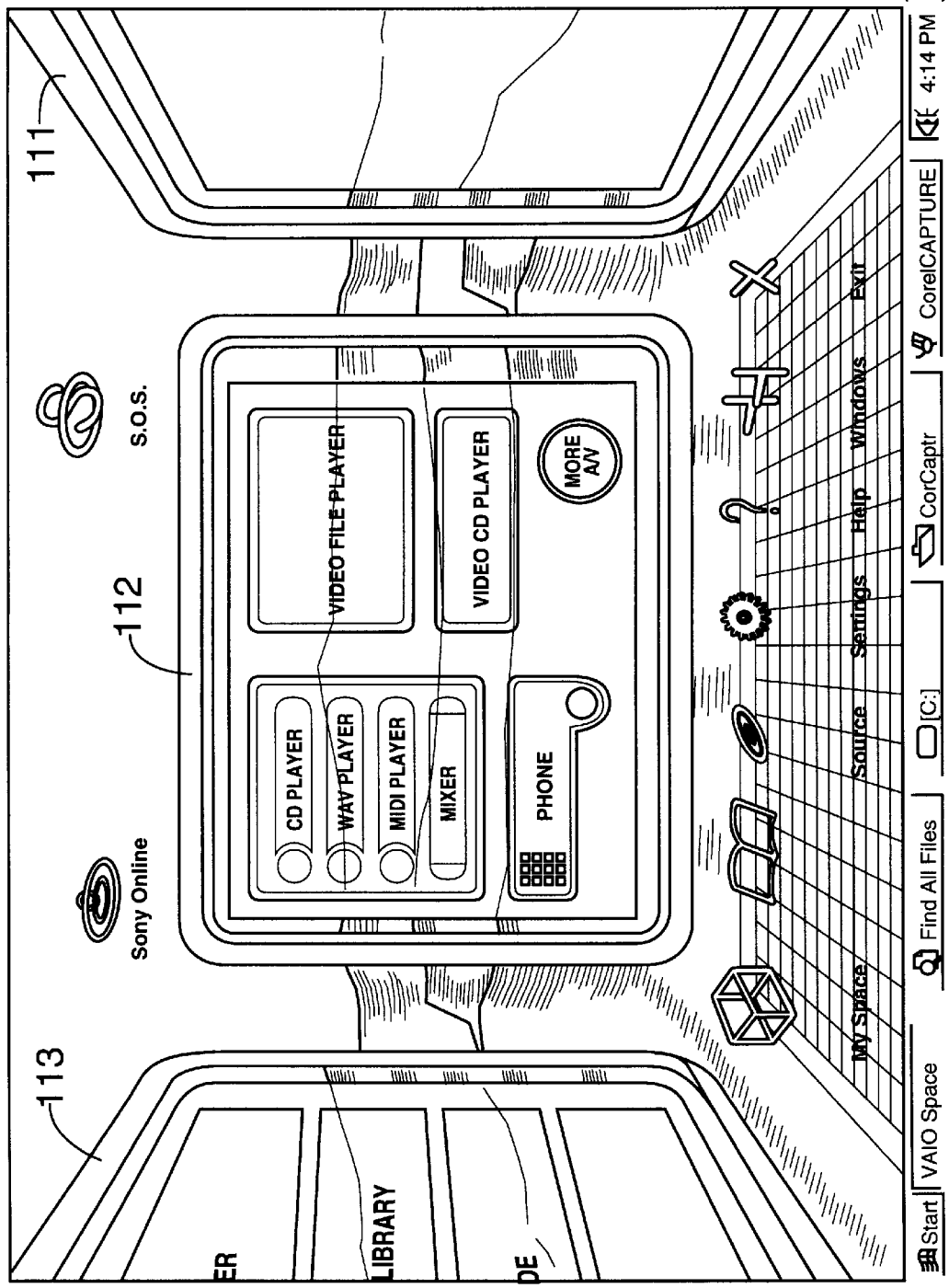
FIG. 5 shows a display example in the A/V mode.

For example, in the Video mode shown in FIG. 4A, when the user clicks once with mouse 22 any portion of A/V Wall 112 which is displayed on the left, the Video mode turns to the A/V mode as shown in FIG. 5. In this case, A/V Wall 112 is displayed at the center, Video Wall 111 is displayed on the right (at the position where Application Wall 113 was displayed until then as shown in FIG. 4A) and Application Wall 113 is displayed on the left (at the position where A/V Wall 112 was displayed until then). After A/V Wall 112 moves to the center and when the user further clicks any button in A/V Wall 112, a corresponding function is activated. Alternatively, the user may double-clicks the button in A/V Wall 112 when A/V Wall 112 is displayed on the left in the Video mode, so that the corresponding function is immediately activated.

Figure 6A:
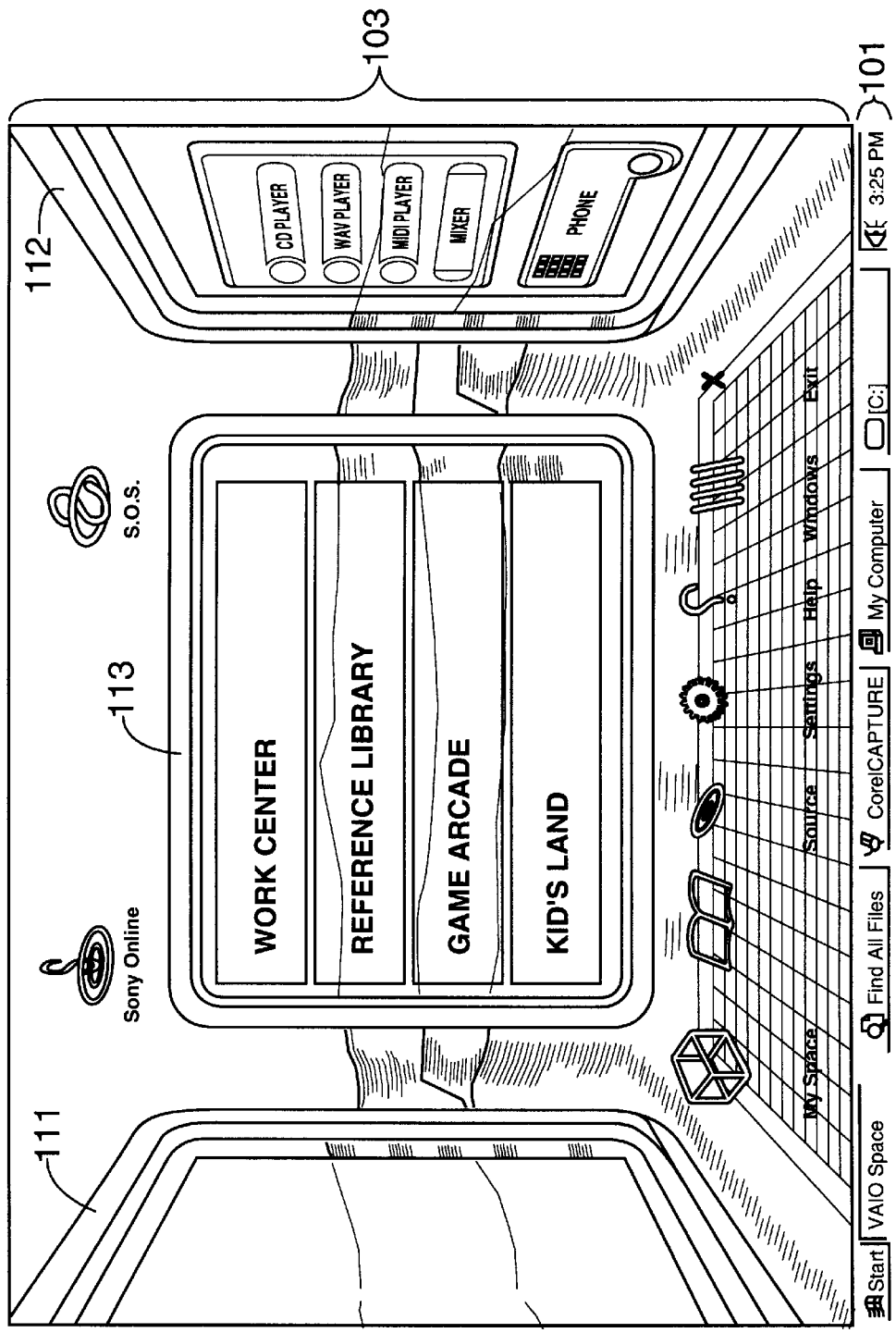
FIGS. 6A and 6B show a display example in the Application mode.

In the Video mode shown in FIG. 4A, when the user clicks once any portion of Application Wall 113 which is displayed on the right, the Video mode turns to the Application mode, as shown in FIG. 6A. In the Application mode, Application Wall 113 is displayed at the center, Video Wall 111 is displayed on the left and A/V Wall 112 is displayed on the right. After Application Wall 113 moves to the center and when the user further clicks any button in Application Wall 113, a corresponding function is activated. Alternatively, the user may double-clicks the button in Application Wall 113 when Application Wall 113 is displayed on the right in the Video mode, so that the corresponding function is immediately activated.

In the A/V mode as shown in FIG. 5, when Video Wall 111 on the right is clicked once, the A/V mode changes back to the Video mode as shown in FIG. 4A. Similarly, in the A/V mode, when Application Wall 113 on the left is clicked once, the Application mode is called as shown in FIG. 6A. An image in Video Wall 111 is displayed as a moving picture in the Video mode shown in FIG. 4A. However, as shown in FIGS. 5 and 6A, when Video Wall 111 is placed on the left or right (when only a portion thereof is displayed), the image on Video Wall 111 is not a moving picture. Instead, an image at the moment of the transfer to that mode is displayed as a still picture.

Referring to FIG. 5 showing the A/V mode, A/V Wall 112 is displayed at the center of the screen. A/V Wall 112 may also be a transparent screen so that a background image can be seen through it. On this transparent screen, selection buttons of a CD player, a WAV player, a MIDI player and a Mixer are displayed as a group. As explained above, these buttons are clicked with mouse 22 when the corresponding functions need to be carried out.

The CD player button is operated to drive CD-ROM drive 42. WAV is a format name of files of sounds handled by a personal computer. The WAV player button is clicked to reproduce audio data of a certain name which data is stored as a file. The MIDI player button is operated to reproduce musical instrument sounds by using a WAV table for storing digital data of phoneme of the musical instrument sounds. The Mixer button is operated to mix plural audio signals.

Under the group of these buttons, PHONE button is displayed. The PHONE is a telephone software for a personal computer. By starting the PHONE, a telephone function, an answering machine function and a facsimile function can be achieved. It also has a telephone directory function and can store plural telephone numbers. By simply selecting a certain number among the plural telephone numbers and instructing a start command, the user can make a call to that number.

A Video File Player button is arranged on the right of the CD player button. The Video File Player button is operated to playback a VCR and/or video disk (not shown). A Video CD Player button under it is for playbacking a Video CD Player (not shown).

A More A/V button is arranged at the lower right position of A/V Wall 112. The More A/V button is operated when a new application software is stored. The More A/V button is also operated for setting of a surround system, a volume of main body 31 of the personal computer and so on.

Referring to FIG. 6A showing the Application mode, Application Wall 113 is displayed at the center of the screen. A/V Wall 112 may also be a transparent screen so that a background image can be seen through it. Four buttons (folders) of Work Center, Reference Library, Game Arcade and Kid's Land are displayed in Application Wall 113. The Work Center is a folder for registering business software and the Reference Library is a folder for registering dictionaries and so on. The Game Arcade is a folder for registering game software and the Kid's Land is a folder for registering educational software.

Referring to FIGS. 4A, 5 and 6A which show the Video mode, the A/V mode and the Application mode, respectively, taskbar 101 of the WINDOWS 95 operating system is visible at the bottom of the screen during operation of the three-dimensional GUI created and displayed by the navigator software. This taskbar is same as displayed when the user is in the WINDOWS 95 operating system environment. As shown in FIGS. 4A, 5 and 6A, Start button 102 and a clock image for indicating a time are respectively displayed on the left and the right of taskbar 101. Above taskbar 101, image displaying portion 103 is provided and a substantial menu image is displayed there. By making taskbar 101 visible, the navigator software provides access to important operating system functions from within the graphical user interface by the navigator.

Figure 6B:
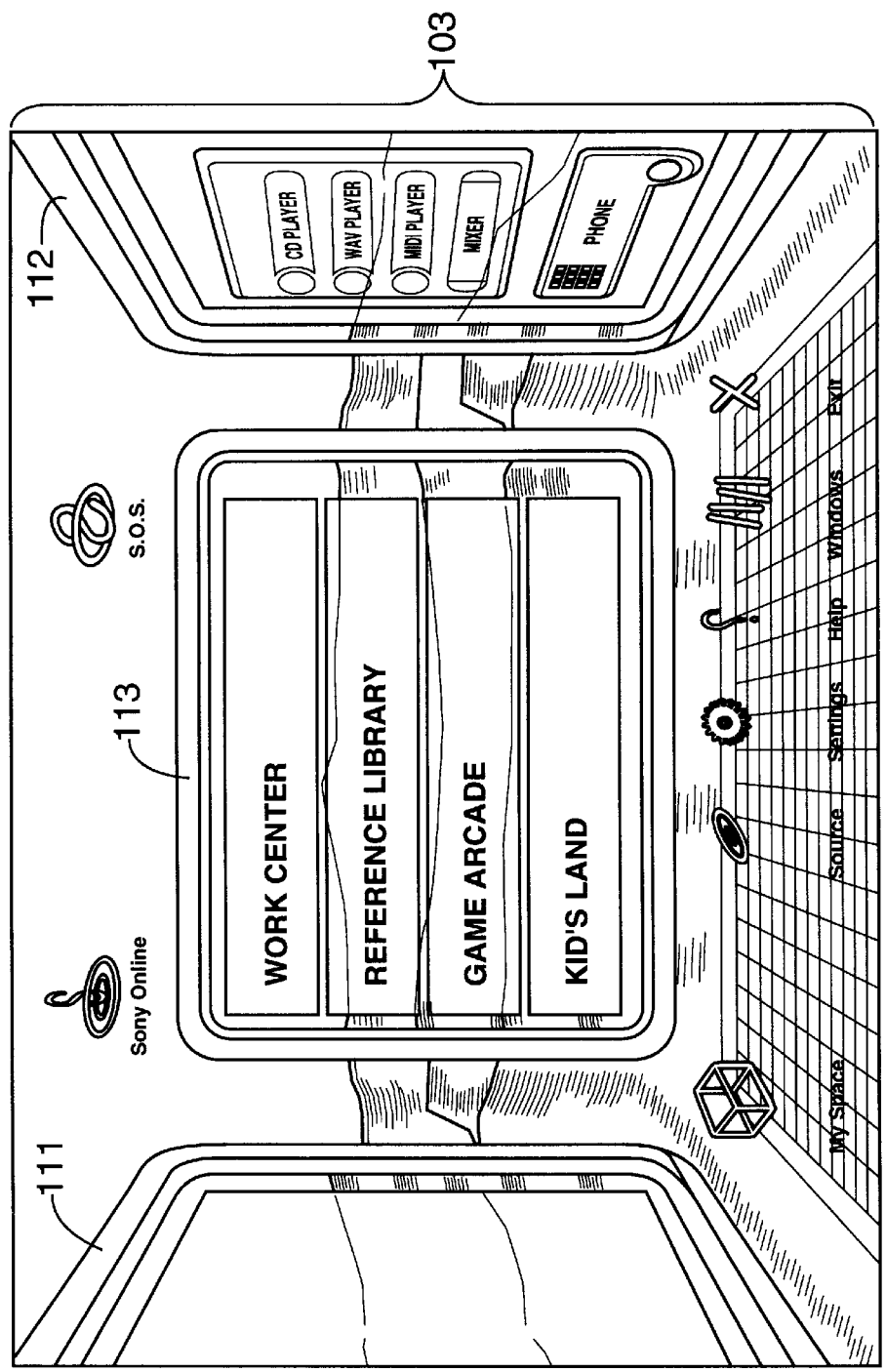

The navigator makes taskbar 101 available from within the graphical user interface, either by fixing the display of taskbar 101 along the bottom of the screen no matter which wall the user is viewing at the center, as shown in FIGS. 4A, 5 and 6A, or by using "autohide" feature. The autohide feature keeps taskbar 101 hidden so that the entire screen of CRT 55 can be used to display the graphical user interface by the navigator. This is shown in FIG. 6B, for example. No taskbar appears at the bottom of the screen in FIG. 6B. When the user moves a mouse pointer toward the bottom of the screen where taskbar 101 would normally be displayed, taskbar 101 becomes visible again, as shown in FIG. 6A. Once visible, the user can select and activated the buttons on taskbar 101 to invoke function of the WINDOWS 95 operating systems. Other means for un-hiding taskbar 101 are possible such as by using a predefined "hot key" on keyboard 21.

On taskbar 101, when some program has been started and the corresponding window has been opened in the WINDOWS 95 environment, a button corresponding to the opened program is displayed. In order to change the navigator GUI to the window corresponding to the opened program, the user clicks the button on taskbar 101 by mouse 22. When the opened program is closed, the corresponding button on taskbar 101 is also removed from taskbar 101. When start button 102 is clicked with mouse 22, a start menu (not shown) is displayed. In the start menu, there are displayed items necessary to use the WINDOWS 95. These items include, for example, "Program", "File recently used", "Set", "Search", "Help", "Specify file name and execute" or "End of Windows".

When "Program" is clicked, a list of programs ready to be started is displayed. When "File recently used" is clicked, a list of files recently opened is displayed. When "Set" is clicked, a list of elements which construct the system and of which the user can change the setting is displayed. When "Search" is clicked, folders, files, commonly owned computers, mails, messages and so on can be searched. When "Help" is clicked, a help function is started. By using the help function, the user can find how to operate WINDOWS from a screen of table of contents and a keyword screen. When "Specify file name and execute" is clicked, a program can be started or a folder can be opened in the same way as when MD-DOS (trademark) commands are input. When "End of Windows" is clicked, a mode to disconnect a power supply to a computer is selected. It can also restart the computer or log off from the WINDOWS 95.

By allowing the navigator to co-exist with taskbar 101 of the operating system, the user can use remembered "paths" to access and launch programs and data. Because the navigator software behaves as an application to the operating system, the user can easily move back and forth between the operating system and the navigator. This is because the navigator will appear as an application program and can be provided with a "Navigator button" (not shown) on the taskbar.

Figure 7:
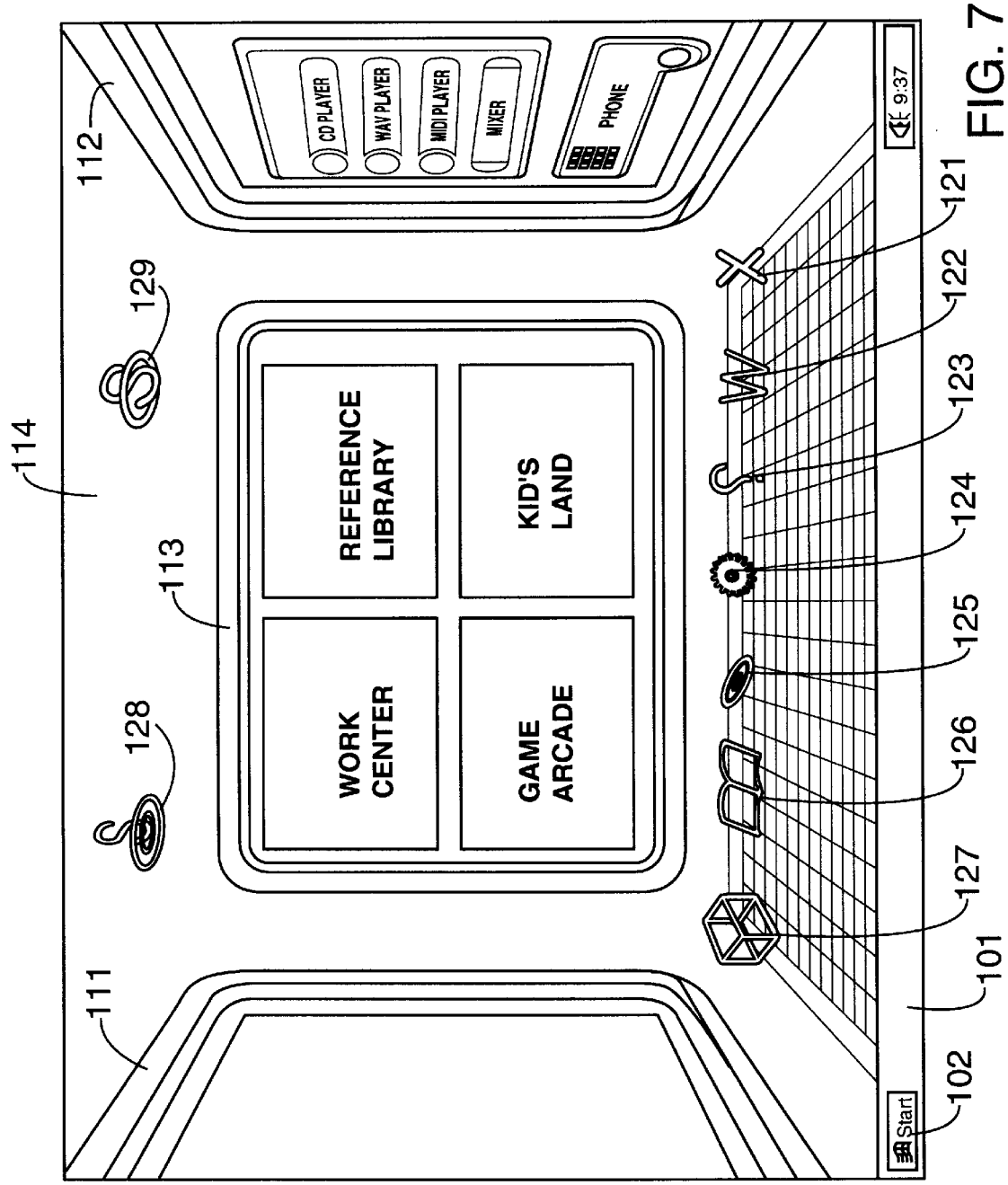
FIG. 7 shows another display example in the Application mode.
Figure 8:
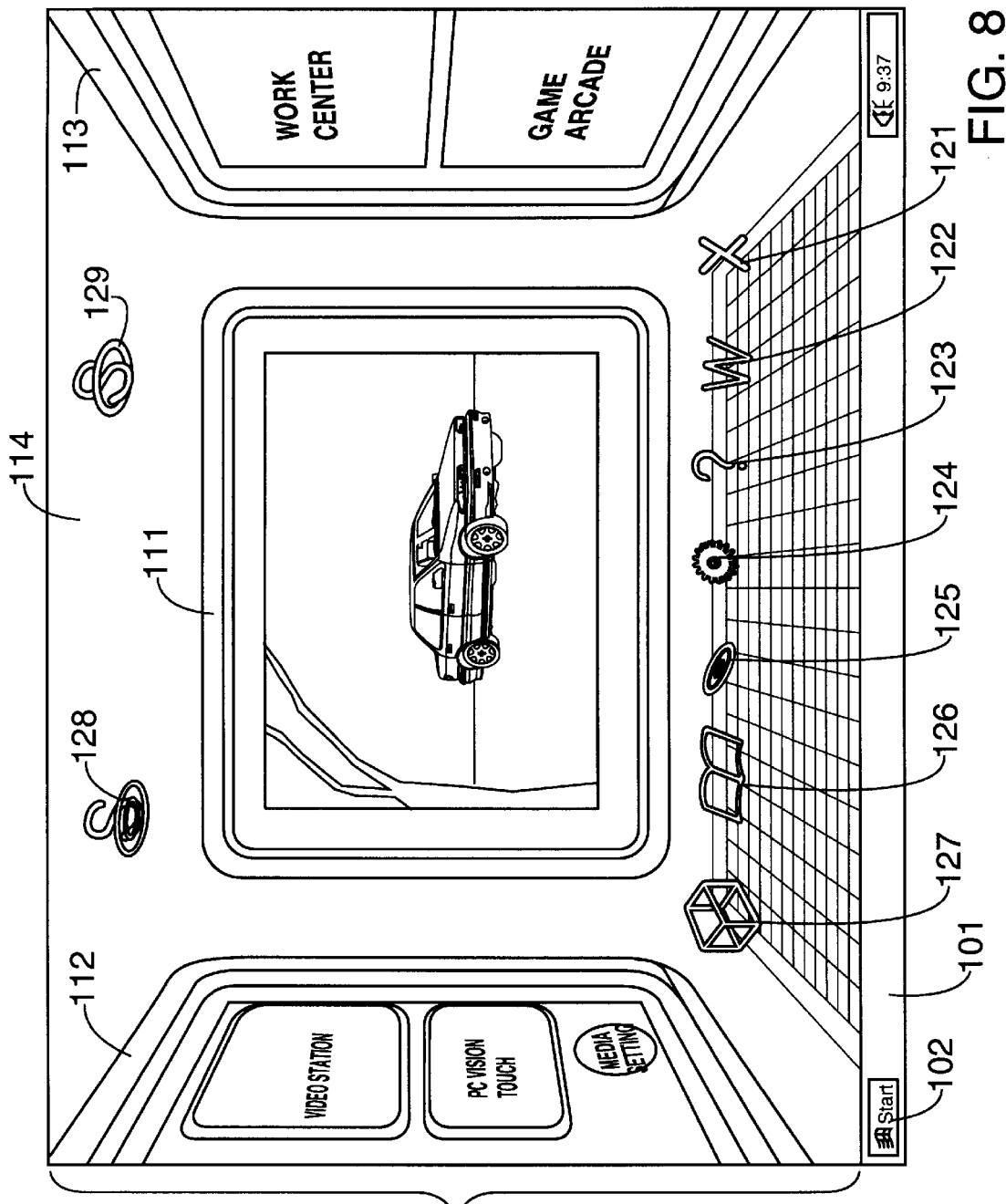
FIG. 8 shows another display example in the Video mode.
Figure 9:
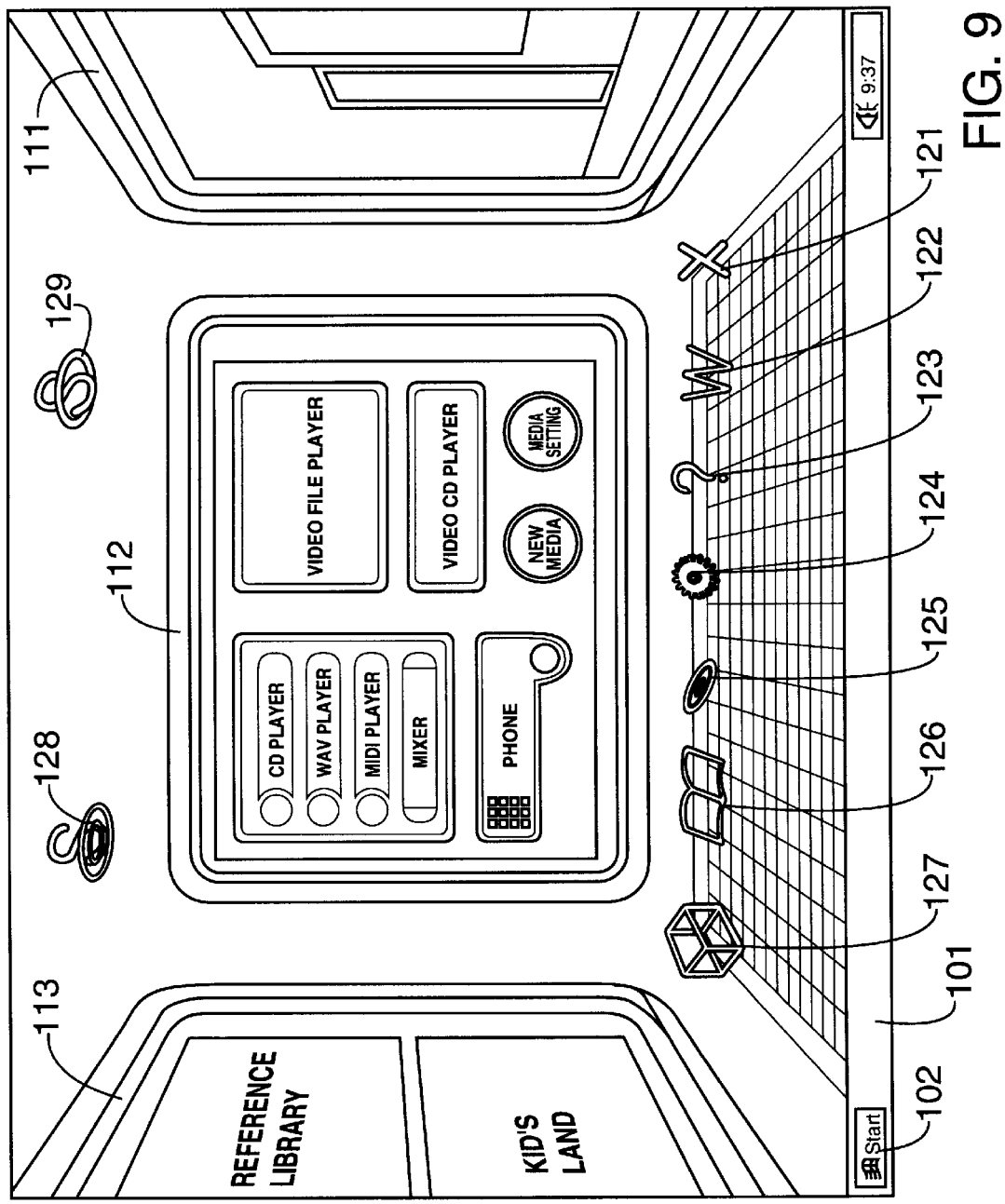
FIG. 9 shows another display example in the A/V mode.

As shown in FIG. 6A, the four buttons in Application Wall 113 are in horizontally elongated shapes. As shown in FIG. 7, for example, these buttons could be arranged in a matrix so that they are positioned at the upper left, upper right, lower left and lower right positions of a rectangle on Application Wall 113. With this arrangement, however, only the two left buttons (the Work Center button and the Game Arcade button) among the four buttons can be displayed in the Video mode, for example, as shown in FIG. 8. In the case of the A/V mode, only the two right buttons (the Reference Library button and the Kid's Land button) can be displayed as shown in FIG. 9. Accordingly, the user cannot see all the four buttons available in the Application mode when the Application Wall is displayed on the left or right. When the user wants to activate the Reference Library or the Kid's Land in the Video mode as shown in FIG. 8, or the Work Center or the Game Arcade in the A/V mode as shown in FIG. 9, these folders cannot be immediately activated because the user cannot double-click these folders which are not displayed in the screen. The user first must select the Application mode by clicking once. Then, only after Application Wall 113 moves to the center and all the four buttons in a matrix can been seen, can the user click a button corresponding to a desired folder.

On the other hand, if each button (folder) is displayed in a horizontally elongated shape, as shown in FIG. 6A, all the four buttons are always seen and can be directly selected by double-clicking in either the Video mode or the A/V mode, as shown in FIGS. 4A or 5. Therefore, a desired folder can be immediately activated without changing these modes to the Application mode first.

Figure 10:
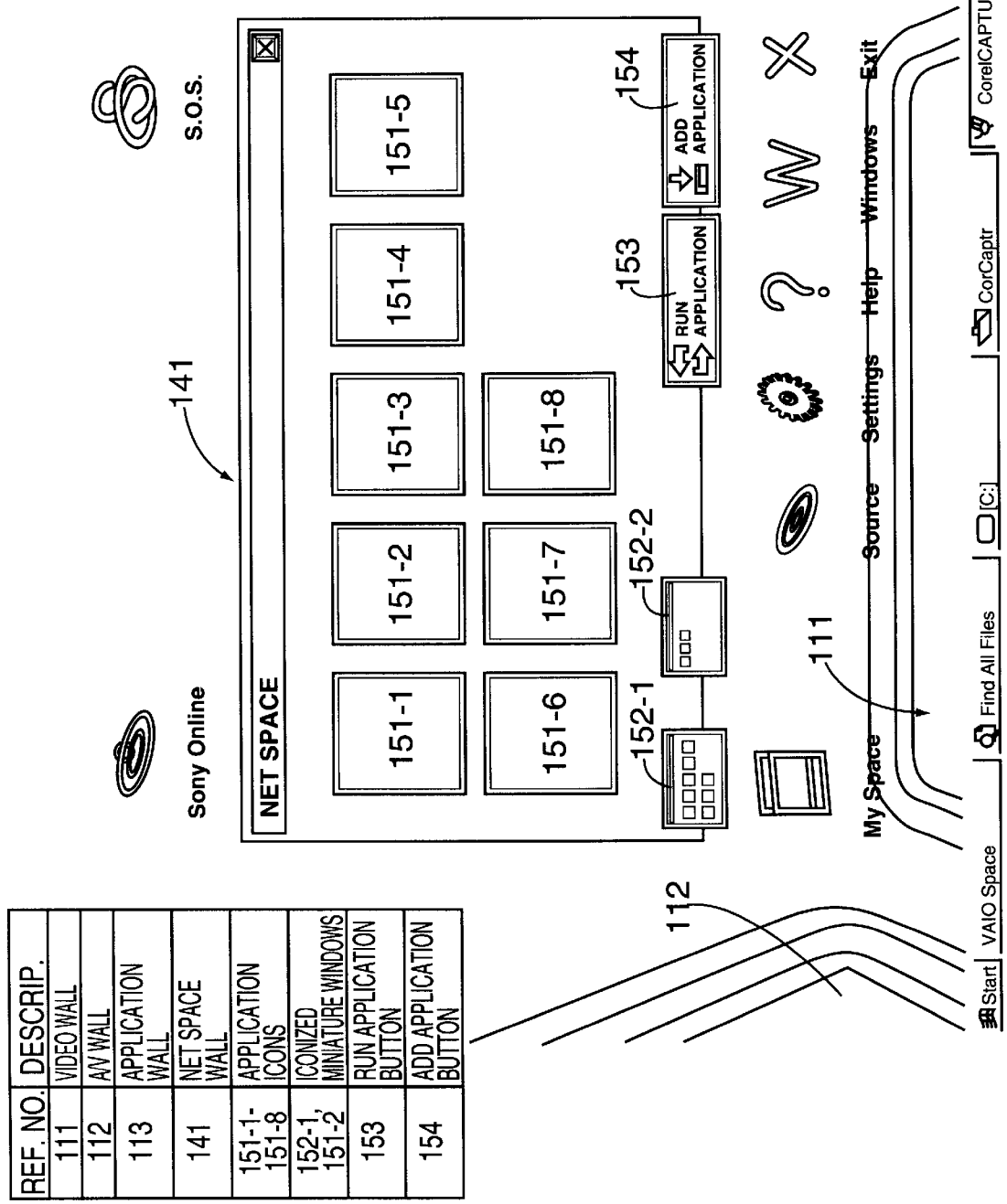
FIG. 10 shows a display example in the Net Space mode.

In each of the modes shown in FIGS. 4A, 5 and 6A, when the user clicks Net Space 114 which exists above the Wall displayed at the center, it changes to a Net Space mode and a menu is displayed as shown in FIG. 10. In this mode, Net Space Wall 141 is displayed nearly at the center. A part of Video Wall 111 is displayed under it, a part of A/V Wall 112 is displayed at the lower left and a part of Application Wall 113 is displayed at the lower right.

As shown in FIG. 10, on Net Space Wall 141, there are arranged eight icons 151-1 to 151-8 corresponding to various kinds of application software. At the lower left of Net Space Wall 141, there are arranged "iconized" miniature windows 152-1 and 152-2. These miniature windows correspond to different pages which Net Space Wall 141 comprises only one of the pages can be displayed at once. Since two miniature windows 152-1 and 152-2 are displayed in this example, it indicates that there are two different pages accessible in Net Space Wall 141. Miniature window 152-1 corresponds to the first page which is currently displayed. Similarly, miniature window 152-2 corresponds to the second page. Accordingly, the user can easily recognize that there are total two pages on Net Space Wall 141 even though he can see only one full page at once. There may be up to four pages in Net Pace Wall 141.

Eight miniature icons in miniature window 152-1 correspond to currently displayed icons 151-1 to 151-8 on the first page. Note that a size of miniature icons in miniature window 152-1 is larger than that of miniature icons in other miniature window 152-2. The miniature window having larger miniature icons corresponds to the currently displayed page of Net Space Wall 141. Therefore, if the miniature icons in miniature window 152-2 are larger than other miniature icons in miniature window 152-1, it shows that the second page is currently opened. In addition, the user can also know how many icons (application software) exist in each page before actually opening the page. Note that miniature window 152-2 has only three miniature icons therein. This means that the second page of Net Space Wall 141 has only three icons therein.

In order to change the page of Net Space wall 141, the user clicks a miniature window corresponding to the desired page. If the user clicks miniature window 152-2, for example, the second page is displayed and three icons are displayed therein. The size of the three miniature icons in miniature window 152-2 becomes larger while the size of the eight miniature icons in miniature window 152-1 becomes smaller. As a result, the user can notice that the currently displayed page is the second page which corresponds to miniature window 152-2.

Even though the currently displayed page is indicated by the larger size of miniature icons in miniature window in this embodiment, color or other attribute of miniature icons or miniature windows may be changed to indicate which page is currently opened. For example, among miniature windows, a miniature window corresponding to the currently displayed page may be highlighted or reversely displayed to be distinguished from other miniature windows corresponding to unopened pages.

When Run Application Button 153 located at the lower portion of Net Space Wall 141 is clicked after certain one of icons 151-1 to 151-8 is selected, an application software corresponding to the selected icon is started. Add Application button 154 is operated to add a new application software to a folder displayed by Net Space Wall 141.

In the Net Space mode shown in FIG. 10, when the user clicks any one of Video Wall 111, A/V Wall 112 and Application Wall 113, the mode turns to the Video mode, the A/V mode and the Application mode shown in FIGS. 4A, 5 and 6A, respectively. In any one of the above four modes, if the above-described screen saver function is turned on, the mode turns to a full screen video mode when there is no input by the user for a predetermined period. When keyboard 21 or mouse 22 is operated in the full screen video mode, it turns back to the immediately proceeding mode (the last mode).

Figure 11:
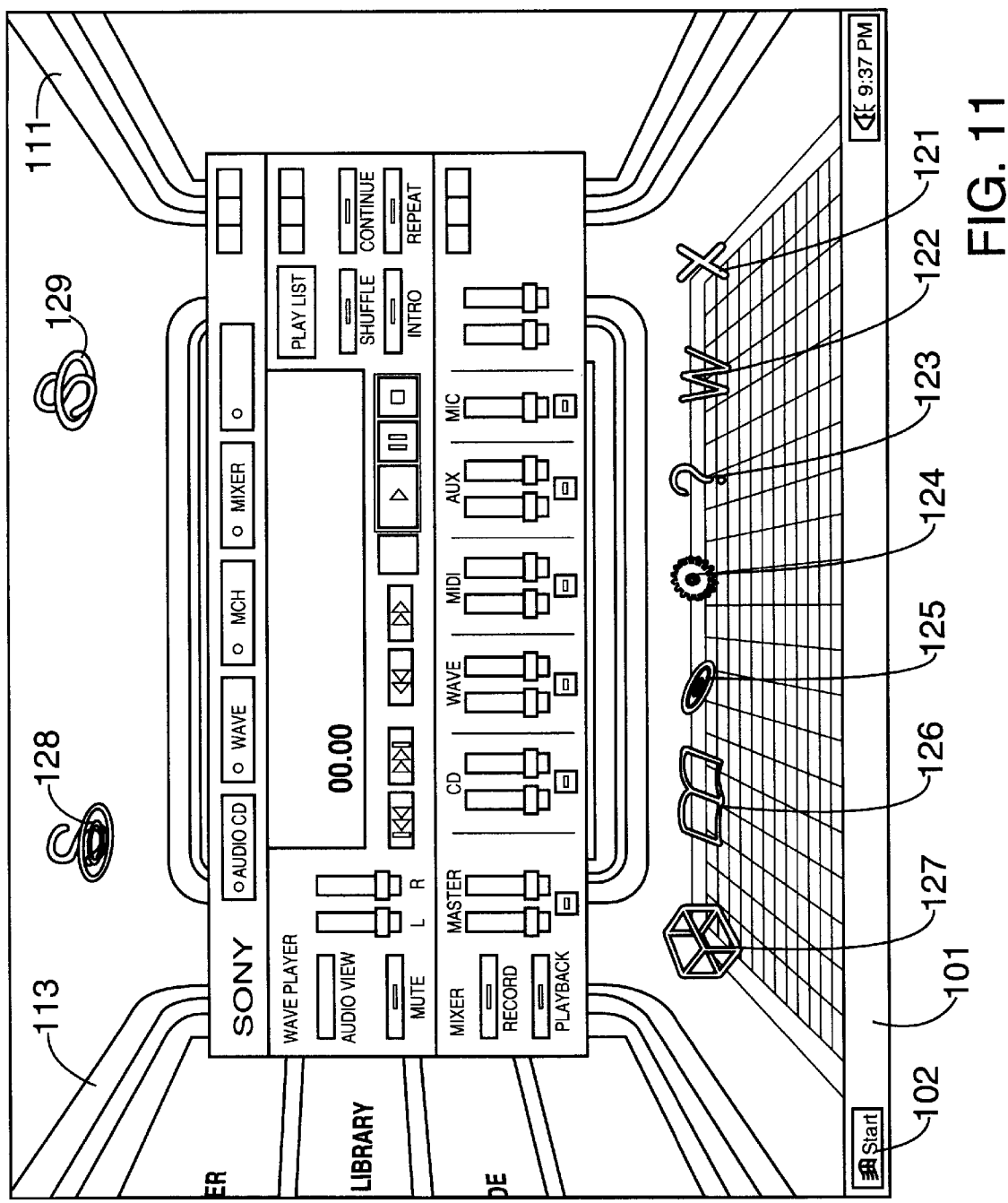
FIG. 11 shows a display example when the WAV player button shown in FIG. 5 is operated.

Next, lower level windows with respect to the above-described upper level walls will be explained. In the A/V mode shown in FIG. 5, when the WAV Player button is clicked, operational panels of the WAV Player and Mixer are displayed in front of A/V wall 112, Video Wall 111 and Application Wall 113, as shown in FIG. 11. Various kinds of buttons are displayed on the operational panel. The user can operate any button among the various kinds of buttons so that he can command the WAV Player and Mixer to do a certain function. Similarly, in the A/V mode shown in FIG. 5, when the CD button is turned on, images of operational panel of a CD player is displayed.

Alternatively, when the WAV player button in A/V Wall is double-clicked in the Application mode shown in FIG. 6A, it turns to the A/V mode shown in FIG. 11 and an operational panels of the WAV player and Mixer are immediately displayed. In this case, there is no need to change a mode from the Application mode shown in FIG. 6A to the A/V mode shown in FIG. 5 and then to operate the WAV player button. Instead, double-clicking the WAV player button in the A/V mode shown in FIG. 6A not only changes the mode to the A/V mode, but also immediately activates the WAV player function a shown in FIG. 11. Therefore, a quick operation is possible.

Figure 12:
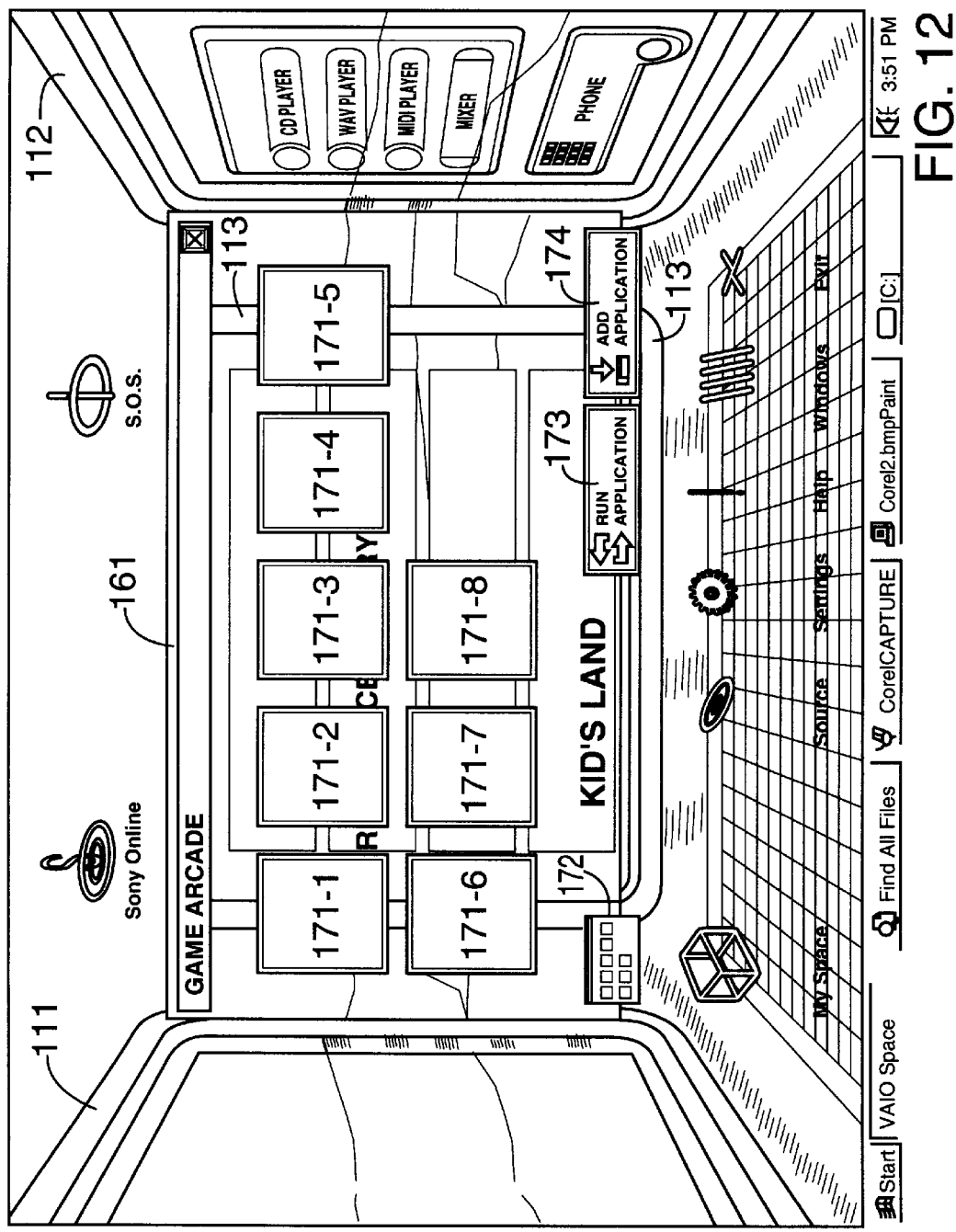
FIG. 12 shows a display example when the Game Arcade button shown in FIG. 6A is operated.

On the other hand, when a button of the Game Arcade is clicked in the Application mode shown in FIG. 6A, for example, Game Arcade Window 161 is displayed in front of and almost entirely covering Application Wall 113, as shown in FIG. 12. Game Arcade Window 161 is transparent so that Application Wall 113, which is the upper level to Game Arcade Window 161, can be seen through behind Game Arcade Window 161. Therefore, the user can easily recognize what is the upper level window (Application Wall 113) of the currently displayed lower level window (Game Arcade Window 161) and that the upper level window is opened behind the lower level window.

A method for making an image half-transparent so that an image behind a front image can be seen through is described in Japanese laid-open patent 64-65627 and Japanese laid-open patent 01-65627, for example. One way to display a half-transparent image is to alternatively display pixels of each of two overlapping windows so that the pixels of both windows are arranged in a checkered pattern.

In Game Arcade Window 161 shown in FIG. 12, there are displayed icons 171-1 to 171-8 corresponding to eight application software registered in this folder. At the lower left position of Game Arcade Window 161, there is "iconized" miniature window 172 corresponding to pages of Game Arcade Window 161. In this embodiment, since Game Arcade Window 161 comprises only one page, only one miniature window 172 is displayed. Therefore, the user can easily recognize that there is only a single page in Game Arcade Window 161.

At the lower right position of Game Arcade Window 161, Run Application Button 173 and Add Application button 174 are arranged. These buttons have the similar functions to those of Run Application Button 153 and Add Application button 154 shown in FIG. 10.

Figure 13:
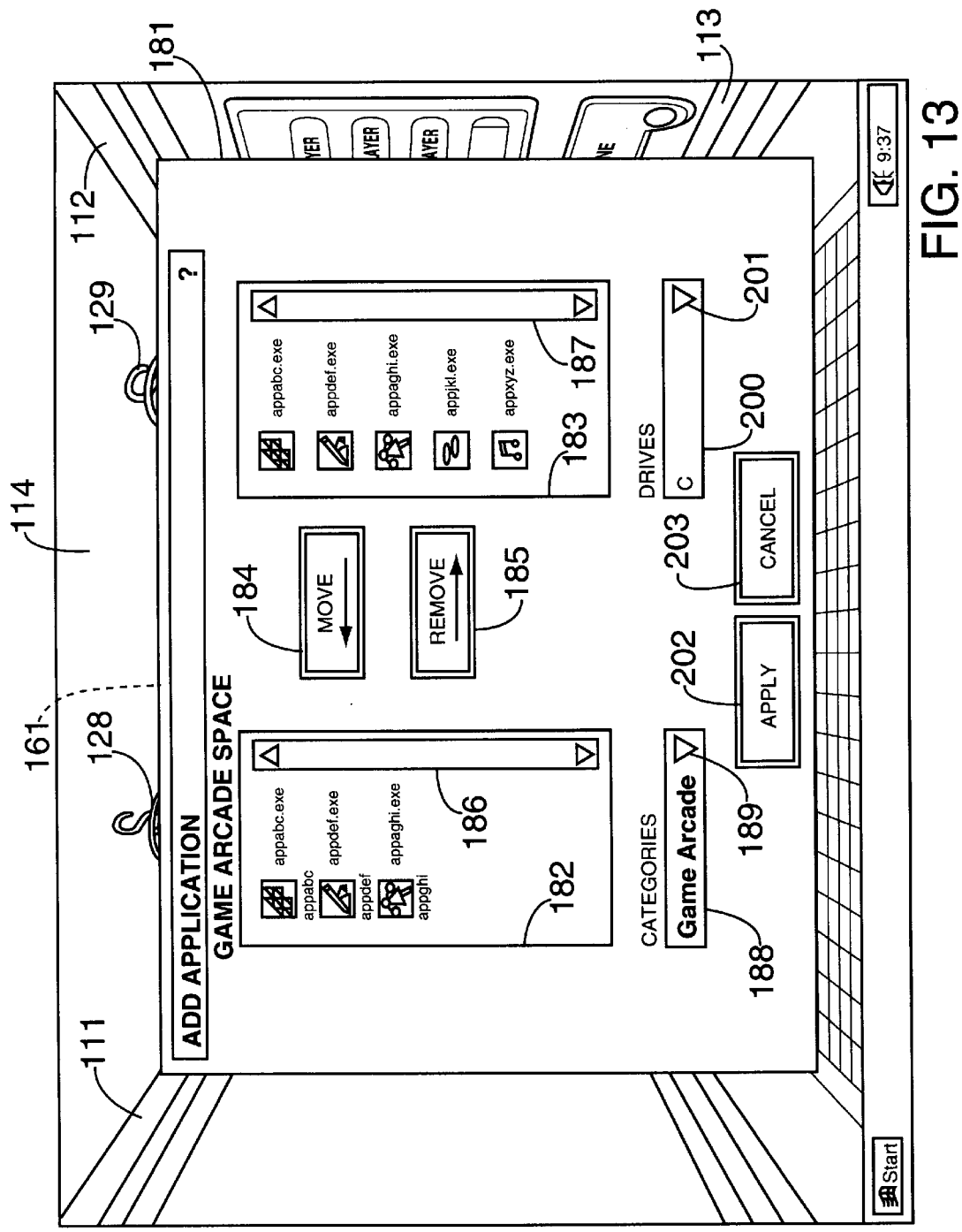
FIG. 13 shows a display example when an Add Application button shown in FIG. 12 is operated.

FIG. 13 shows a display condition when Add Application button 174 shown in FIG. 12 is operated. In this case, Add Application Window 181 is displayed in front of Game Arcade Window 161. Since Add Application Window 181, which is of further low level, is also transparent, the user can recognize that Game Arcade Window 161 is displayed behind it. However, FIG. 13 shows Add Application Window 181 as non-transparent for the simplification of the drawing and for the easier understanding thereof.

Game Arcade space and WINDOWS 95 (trademark) space are displayed on Add Application Window 181 and names and icons of software registered in each of them are displayed on displaying portions 182 and 183. In this embodiment, six files; appabc. exe, appdef. exe, appghi. exe, appjkl. exe and appxyz. exe are registered in the WINDOWS 95 (trademark) space. Three files; the appabc. exe, the appdef. exe and the appghi. exe among the six files are registered in the Game Arcade space. The user can register any file existing in the WINDOWS 95 (trademark) space to the Game Arcade space by operating Move button 184. The user can move any file registered in the Game Arcade space back to the WINDOWS 95 (trademark) space by clicking Remove button 185. In displaying portion 183 of the WINDOWS 95 (trademark) space, the software registered in the Game Arcade space have their brightness or colors changed or are reversely displayed so that they can be distinguished from those not registered.

Scroll bars 186 and 187 are displayed in displaying areas 182 and 183 of the Game Arcade space and the WINDOWS 95 (trademark) space, respectively. If there are too many files to be displayed at once in each displaying area, the file names are scrolled up or down by adjusting the scroll bar with mouse 22 so that a desired file name can be displayed.

Under displaying portion 182 of the Game Arcade space, there is provided with displaying area 188 for displaying the name of category displayed in displaying portion 182. In this embodiment, a name of the Game Arcade is displayed there as a category. Button 189 is operated to scroll the categories. In displaying area 200 for displaying names of drives, C drive is displayed in this embodiment. A name of drive displayed in displaying area 200 can be scrolled by operating button 201. For example, by operating button 201, a certain drive name is specified in drive displaying area 200. Currently, drive C (hard disk) is specified. In this case, names of software stored in the hard disk are displayed in displaying area 183 of the WINDOWS 95 (trademark) space.

When the user operates button 189 in displaying area 188 to display a certain category in displaying area 188, names of application software registered in that category are displayed in displaying area 182. The user operates Move button 184 and Remove button 185 so that a certain application software can be registered in a folder of that category.

To carry out registration to the Game Arcade space (folder), the user operates Apply button 202. When the user finally does not want to register for some reasons, he operates Cancel button 203. When Apply button 202 or Cancel button 203 is operated, a display condition shown in FIG. 13 goes back to a display condition shown in FIG. 12.

In various menu screen as shown in FIGS. 4A, 5, 6A, 10, 11 and 12, in addition to buttons (icons) each corresponding to each folder, icons 121 to 129 in the form of symbolized three-dimensional objects are superimposed on the background image. They are displayed in certain fixed positions such that they do not overlap any of Video Wall 111, A/V Wall 112 and Application Wall 113.

Icon 121 in the form of a three-dimensional symbol of letter X is an icon for an exit and is clicked to end this navigator (a software running on the WINDOWS 95 (trademark) to display the above-described menu image). Icon 122 in the form of a three-dimensional symbol of letter W is operated to carry out the WINDOWS 95 (trademark). In this case, the navigator (software) is minimized and displayed as an icon. Icon 123 displayed as a three-dimensional symbol "?" means a Help function. When icon 123 is clicked a help menu at the time of the clicking is displayed.

Icon 124 displayed as a three-dimensional symbol of gear is an icon for Quick Start Settings. Icon 124 is selected for setting as to whether, immediately after the power-on of main body 31, a software to be started is the WINDOWS 95 (trademark) or the navigator software, or whether a screen saver is on or off. Operations when icon 124 is selected will be explained later referring to FIGS. 14A and 14B.

Icon 125 is displayed in the form of a three-dimensional symbol to imagine a disk. This icon is displayed when software provided by a company providing this navigator software is set in CD-ROM drive 142. Software recorded on the CD-ROM are automatically classified category by category and are registered in a folder corresponding to icon 125.

Icon 126 displayed as a three-dimensional symbol of an opened book is an icon for tutorial and corresponds to a folder for storing tutorial materials to explain an operation of each software. Icon 127 is the My Space icon corresponding to a folder for registering software which the user often uses. Icon 127 is displayed in the form of a three-dimensional symbol of a cube.

Icon 128 is Sony Station (trademark) icon and is displayed in the form of a three-dimensional symbol of two rings arranged under the letter S. When Sony Station icon 128 is clicked, a browser software is started so that a home page of the company which provides this navigator software is automatically accessed through the Internet.

Icon 129 is an icon for Sony Online Support (SOS). When this icon is clicked, a service center for a personal computer is automatically accessed through a network so that the user can obtain on-line instructions for trouble shootings of the personal computer.

Figure 14A:
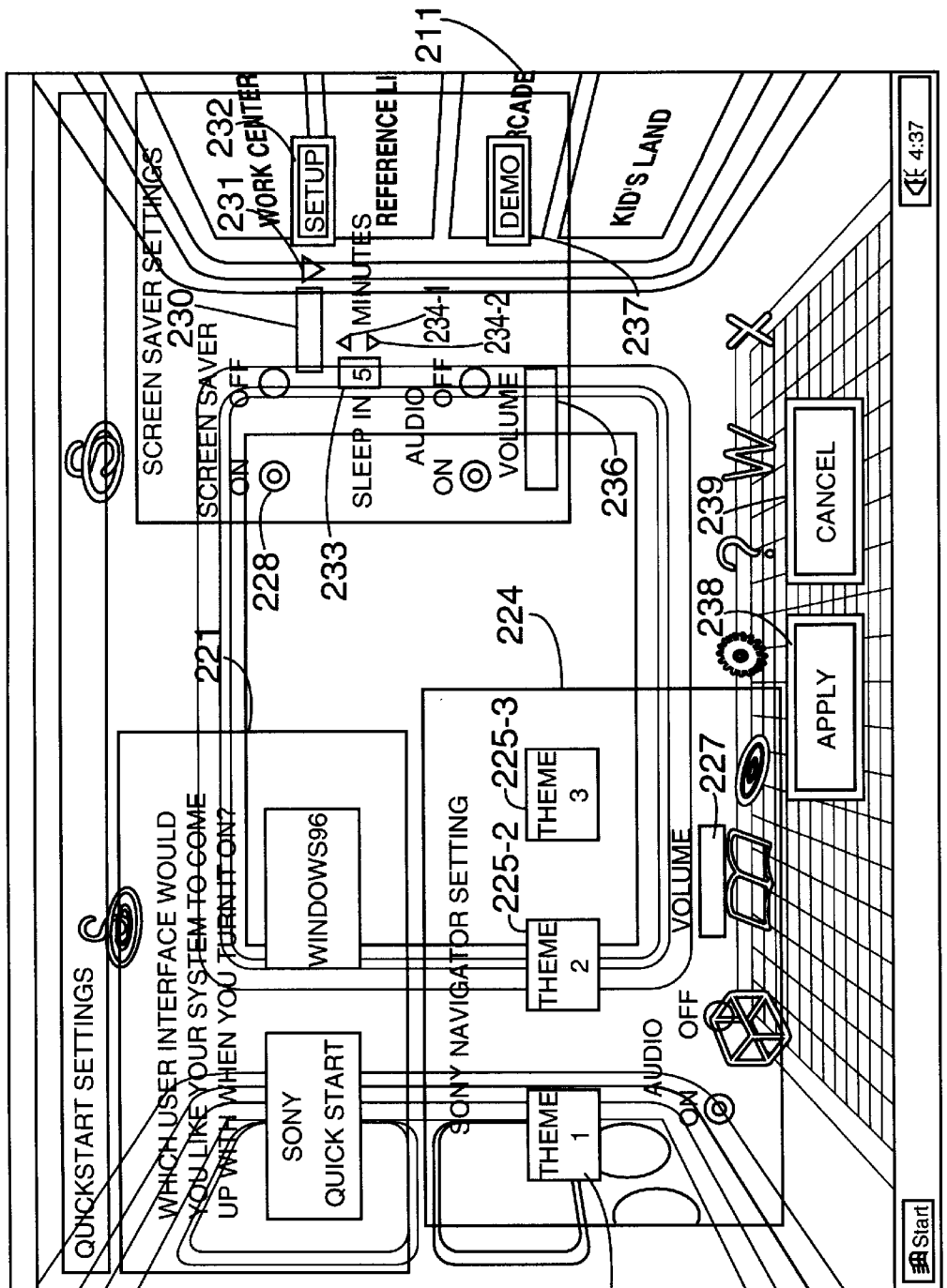
FIGS. 14A and 14B show a display example when a Quick Start Setting icon shown in FIGS. 4A and 4B is operated.
Figure 14B:
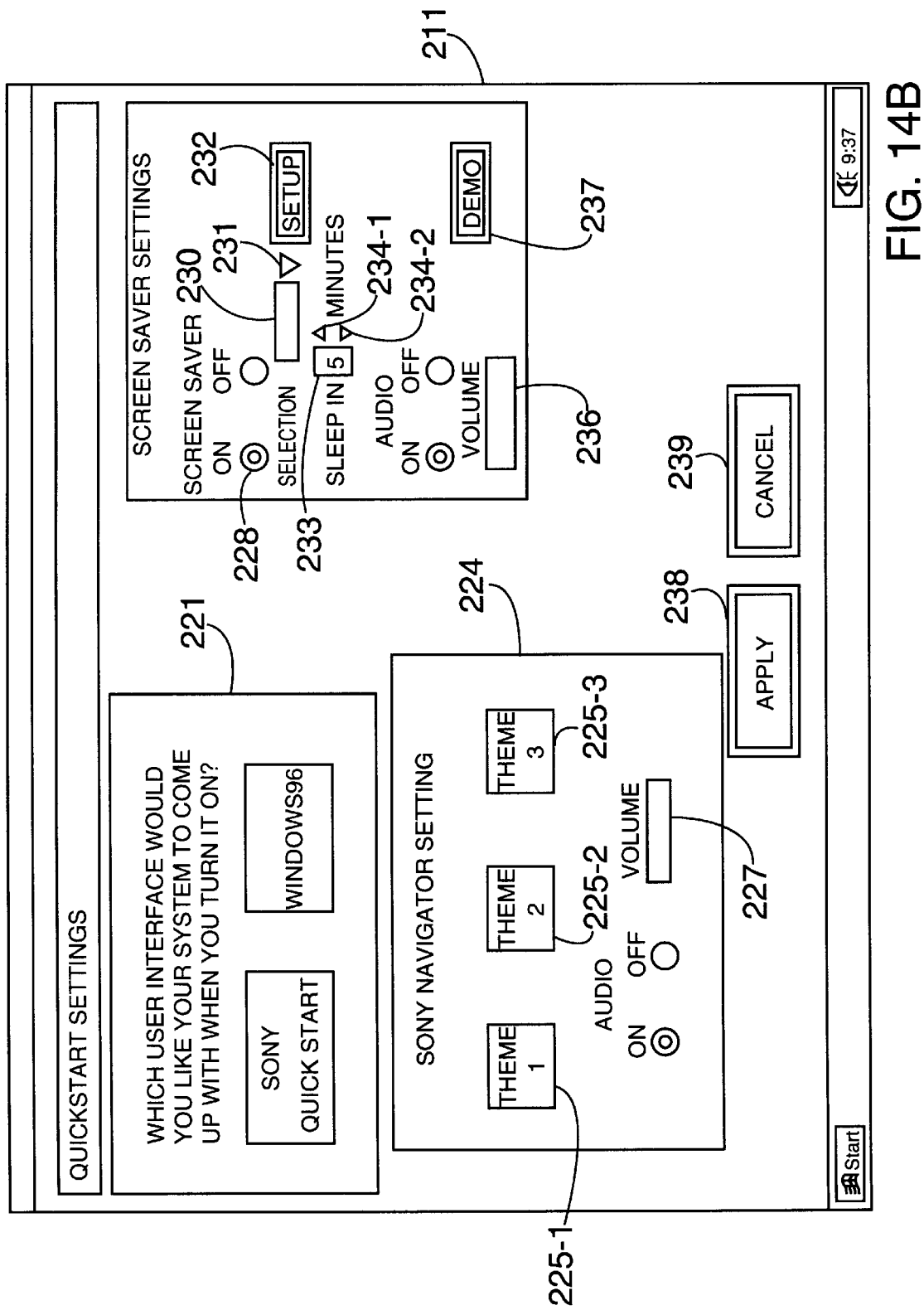

FIG. 14A shows a display example when Quick Start Settings icon 124 is operated. When Quick Start Settings icon 124 is clicked in a situation shown in FIG. 4A, for example, Quick Start Settings window 211 is displayed in front of Video Wall 111, A/V Wall 112 and Application Wall 113, as shown in FIG. 14A. In this case too, Quick Start Settings window 211, which is of lower level, is transparent so that the Walls behind and the background can be seen through. For the convenience of explanation of Quick Start Setting functions, FIG. 14B shows the same as FIG. 14A except that the upper level Walls and the background image to be displayed behind are removed. In Quick Start Settings window 211, the user can select with mouse 22 in displaying area 221 as to which of the WINDOWS 95 (trademark) and the navigator (Sony Quick Start) should be started upon the power-on of main body 31.

In the example shown in FIGS. 14A and 14B, the latter is selected.

In displaying area 224 with displaying portions 225-1 to 225-3, the user can choose one of three kinds of images as themes 1 to 3. The images of the themes 1 to 3 are images each corresponding to when the power-on time is in the morning, in the afternoon and at night, respectively. For example, an image of desert is displayed as a background in the example of display as shown in FIG. 4A. Suppose that the desert image is registered as the theme 1. If a power of main body 31 is turned on in the morning, the desert image appears as a background. When the user turns on main body 31 in the day time or at night, different background image registered as theme 2 or 3 appears. Alternatively, the background image may be chosen not in accordance with the power-on time but in accordance with the current time so that the background is changing as time goes.

By the way, when a mode is switched from one to another, audio signals can be output to inform the user of the switching of the mode. In displaying area 224 shown in FIGS. 14 A and 14 B, it can be selected whether the audio signals should be output (turned on) or not output (turned off). Furthermore, a volume of the audio signals in that case is set in displaying area 227 so that a certain audio volume can be achieved.

In displaying area 228, On or Off of the screen saver function can be selected. When the screen saver function is turned on, Set Up button 232 is clicked so that an image of moving picture to be displayed in the screen saver function can be selected. When Set Up button 232 is operated, a directory for storing moving pictures is displayed. When button 231 is operated after a desired directory is selected, a certain file name among files stored in the directory is displayed in displaying area 230. The user operates button 231 to scroll the file names so that a desired file name is displayed in displaying area 230.

The user changes up or down the number displayed in displaying area 233 by operating Up button 234-1 or Down button 234-2 so that a fixed time to lapse until the screen saver function is turned on is set. It can be also selected whether a certain sound is generated or not (turned on or off) when the screen saver function is carried out. When it is selected that the sound is generated when the screen saver function is carried out, a volume of the sound can be also set in displaying area 236. When Demo button 237 is clicked, the screen saver function which has been set is demonstrated. Apply button 238 is operated to register the above-described setting and Cancel button 239 is operated not to register the setting.

As shown in FIGS. 4A, 5, 6A, 10, 11 and 12, because icons 121 to 129 are displayed in the form of these three-dimensional symbols and superimposed upon the background image, if the icons are made stationary, it is hard for the user to intuitively recognize whether the symbols are a part of the background or icons. In this embodiment, therefore, icons 121 to 129 are rotated so that their 360 degree images are displayed sequentially and continuously. By this, the user can immediately and certainly recognize that the symbols (images) are not a part of the background image but the icons.

In addition, rotating three-dimensional icons 121 to 129 has another effect to avoid the printing of the icon images on the CRT. As shown in FIGS. 4A to 12, these three-dimensional icons are always displayed at the same fixed positions regardless of the modes selected. The three-dimensional icons never disappear except in a rare case. Therefore, the undesirable printing of the icon images on the CRT is more likely to occur than regular type of icon and buttons which appear and disappear at various locations depending upon the mode selected. Even though the positions of three-dimensional icons 121 to 129 are still fixed, rotational movement of them reduces a period for which a certain image is displayed at the same position.

As shown in the above-identified figures, icons 121 to 127 near the ground of the background image are displayed with their shadows thereunder in order to show more realistically that they are three-dimensional images. (Especially, icons 124 and 125 have intensive shadows.) The size of the shadows also change as the icons rotate.

Figure 15:
FIG. 15 is a drawing for explaining bit map data for indicating a rotating condition of an icon.

FIG. 15 shows an example of bit-map to display icon 125 which is rotating. As shown in FIG. 15, bit-map data of eighteen situations 1 to 18 are prepared in advance as bit-map data for icon 125. The bit-map data are read and displayed on display memory 76 in the order from No. 1 to No. 18, so that icon 125 is easily displayed as if it is rotating clockwise. When the shadows are displayed, the image data of both icon 125 and its shadow are prepared in advance as images 1 to 18 and they are sequentially read and displayed on display memory 76. Other three-dimensional icons are also prepared in the same manner using bit-map data. Accordingly, unlike the CD player button and Video File Player button which are displayed in the form of two-dimensional relief in A/V Wall 112 as shown in FIG. 5, icons 121 to 129 are displayed as an image floating in the background and independently existing so that the user can intuitively recognize them as icons.

Figure 16:
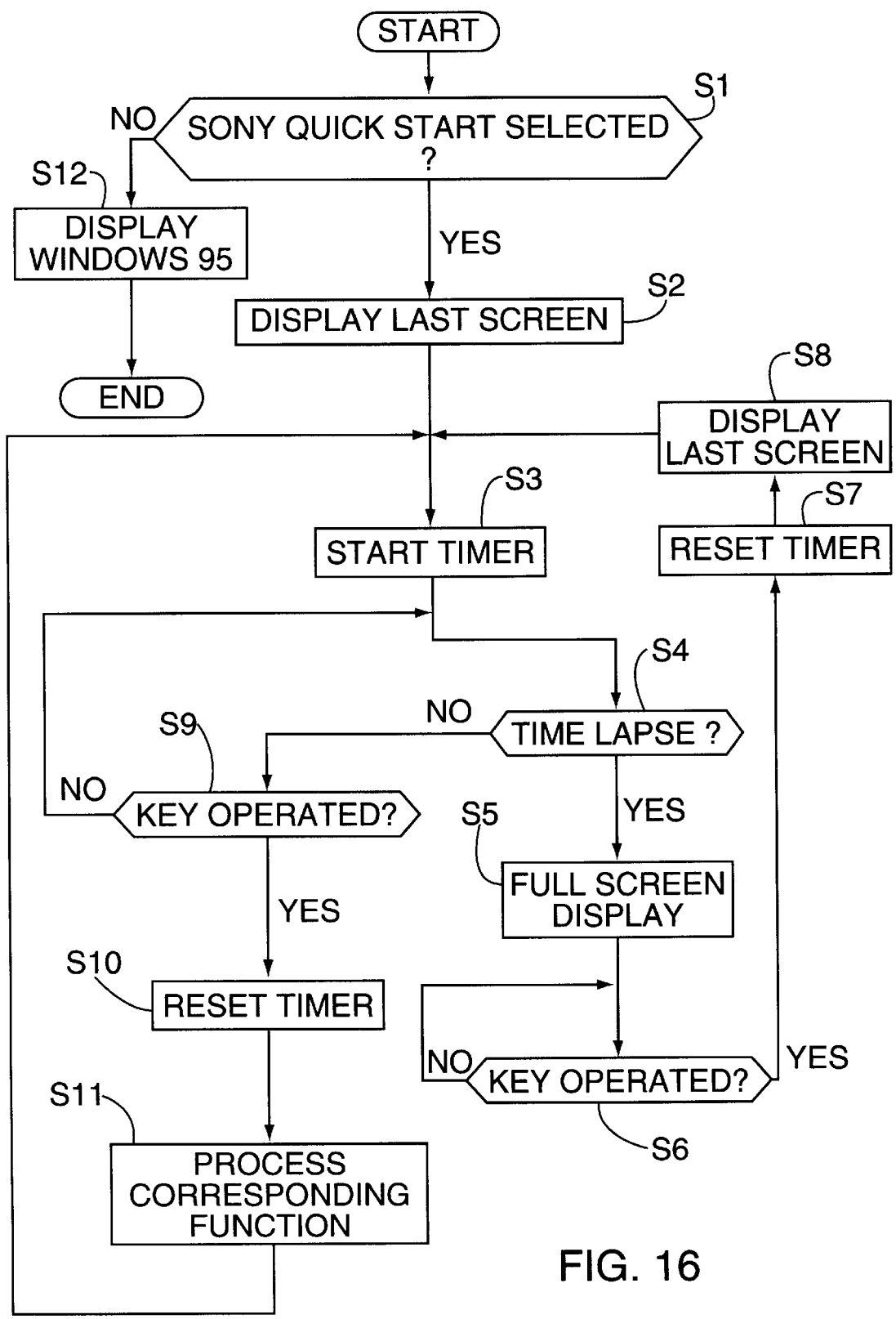
FIG. 16 is a flow-chart for explaining an operation of the embodiment shown in FIG. 2.

Referring to a flowchart in FIG. 16, changes of conditions of the menu screen immediately after the power-on will be explained. When the power is turned on, it is first determined in Step 1 whether the Sony Quick Start has been selected or not. If the user has selected the Sony Quick Start in displaying area 221 shown in FIGS. 14A and 14B, it goes to step 2 (the first means) so that a process to display the last screen is carried out. EEPROM 74 ( or hard disk drive 80) memorizes which one of the Video mode, A/V mode and Application mode is the last mode at the moment of the last power-off. CPU 71 reads the last mode from EEPROM 74 and controls display 51 to display the screen corresponding to the memorized last mode. If the last mode is not stored, that is, if the last mode is not one of the three modes; Video mode, A/V mode and Application mode, a predetermined default screen (screen in the Video mode, for example) will be displayed. If the user turns off the power in the A/V mode, for example, the image shown in FIG. 5 will be displayed again in display 51 when the power is turned on.

Next, it goes to step S3 so that CPU 71 starts its internal timer. When a display condition as shown in FIGS. 4A, 5, 6A or 10 continues for a long time, the same image is displayed at the same position for a long time so that there is a risk that the image is printed on CRT 55. Therefore, if the time period set in displaying area 228 shown in FIGS. 14A and 14B has lapsed, the screen saver function is carried out so that a moving picture image set in displaying area 224 is displayed as a full screen.

In step S4, it is determined whether a predetermined time period (the time set in displaying area 228 shown in FIGS. 14A and 14B) has lapsed or not. If the predetermined time period has not lapsed yet, it goest to step S9 where it is determined whether keyboard 21 or mouse 21 is operated, and if not, it goes back to step S4. In this way, it waits until keyboard 21 or mouse 22 is operated. If it is determined in step S4 that the predetermined time period has lapsed without operation of keyboard 21 or mouse 22, it goes to step S5 so that the full screen display is carried out.

Next, it goes to step S6 so that it waits until keyboard 21 or mouse 22 is operated. When keyboard 21 or mouse 22 is operated, a signal corresponding to the operation is inputted through keyboard/mouse controller 81 to CPU 71. At this time, CPU 71 goes to step S7 so that the timer is reset. Then, it goes to step S8 so that CPU 71 reads the last screen which was displayed immediately before the full screen display and which is stored in EEPROM 74 (or hard disk drive 80) so that the last screen is displayed. After that, it returns to step S3 and steps to follow are repeated.

On the other hand, if it is determined in step S9 that keyboard 21 or mouse 22 is operated, it goes to step S10 so that CPU 71 resets the timer and goes to step S11 (the second means). In step S11, a process corresponding to the operated key is carried out. Then it returns to step S3 and steps to follow are repeated. On the other hand, if it is determined in step S1 that the Sony Quick Start is not selected, it goes to step S12 so that the WINDOWS 95 (trademark) display is carried out.

Figure 17:
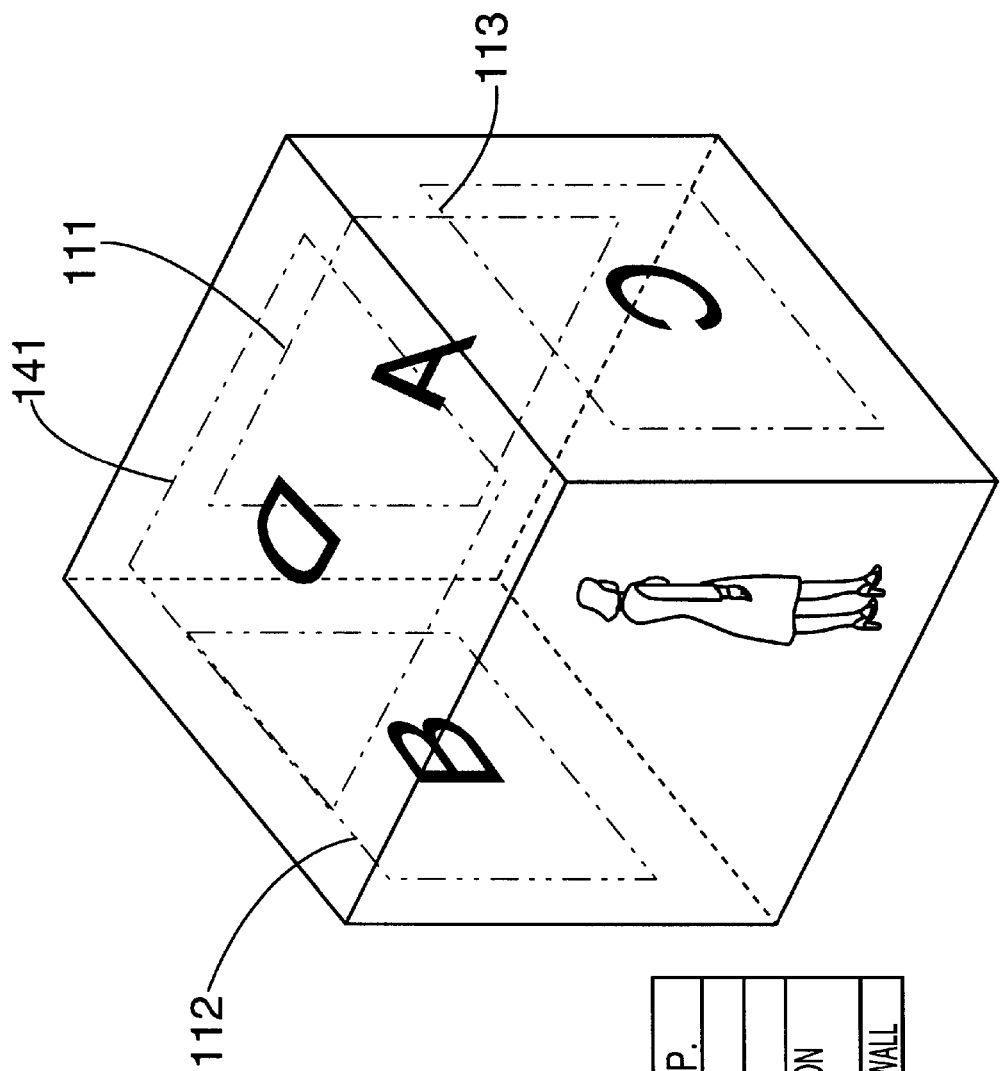
FIGS. 17–22 are a drawing for explaining imaginary screens.

FIG. 17 shows an imaginary screen arrangement of four basic Walls. In this embodiment, an imaginary screen of a three-dimensional rectangular parallelepiped (cube) is imagined. The rectangular parallelepiped (cube) has six faces comprising four sides of front, left, right and back faces and top and bottom faces. Each Wall is arranged on one of the front, left, right and top faces out of the six faces. A menu image is displayed as if the view point of the user exists inside the rectangular parallelepiped.

Figure 18:
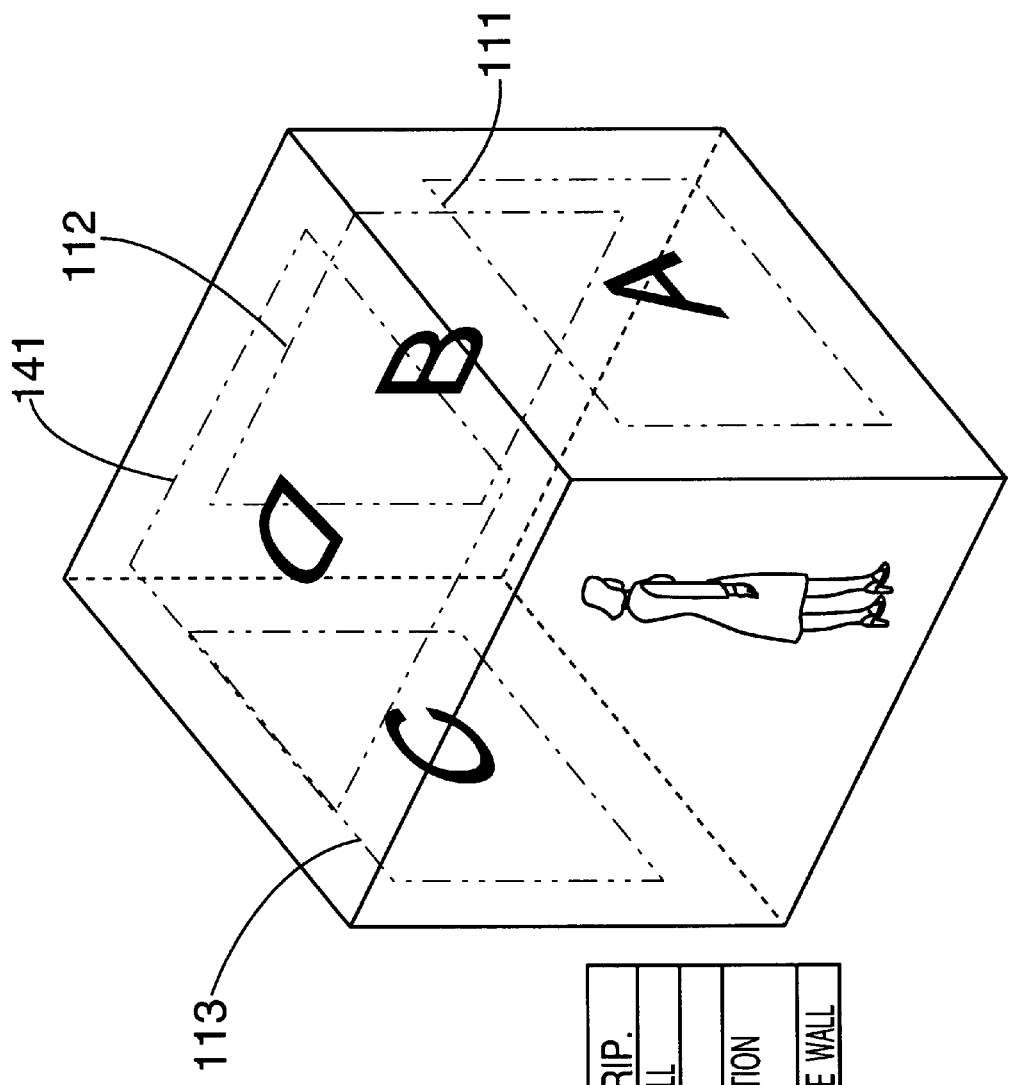

FIG. 17 corresponds to the Video mode shown in FIG. 4A. For the convenience of explanation, letters A, B, C and D are displayed on Video Wall 111 in the front, A/V Wall 112 on the left, Application Wall 113 on the right and Net Space Wall 141 on the top, respectively. As described above, when A/V Wall 112 on the left is clicked in a situation shown in FIG. 17, A/V Wall 112 moves to the front, as shown in FIG. 18. Video Wall 111 which has been displayed in front until then moves to the right where Application Wall 113 has been displayed until then. Application Wall 113 which has been displayed on the right until then moves to the left where A/V Wall 112 has been displayed until then.

Figure 19:
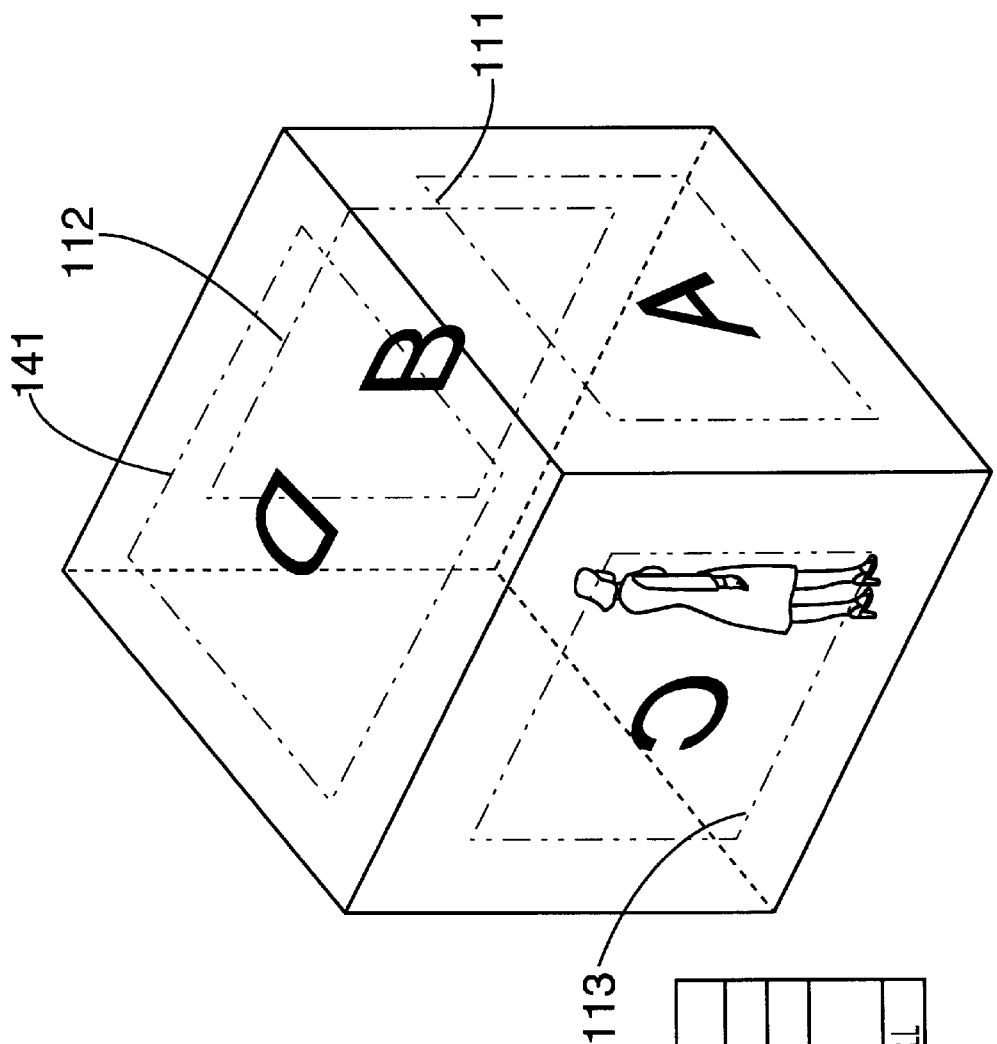

In the imaginary three-dimensional object shown in FIG. 17, where A/V Wall 112 is displayed in front and Video Wall 111 is displayed on the right, it would be natural for Application Wall 113 which has been displayed on the right until then to be displayed on the back, as shown in FIG. 19. In this embodiment, however, Application Wall 113 is displayed not on the back, but on the left, as shown in FIG. 18.

Figure 20:
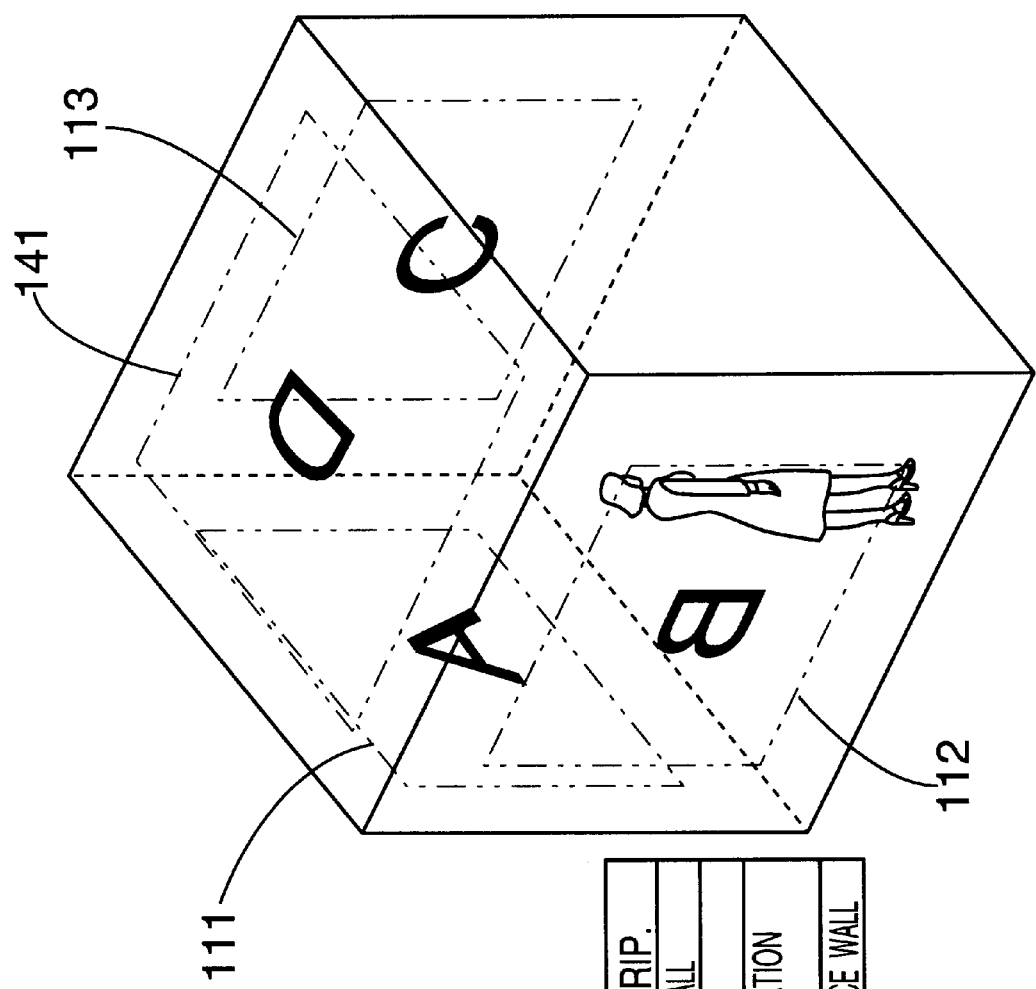

Similarly, when Application Wall 113 on the right is clicked in a situation shown in FIG. 17, Application Wall 113 moves to the front where Video Wall 111 has been displayed until then. Video Wall 111 moves to the left where A/V Wall 112 has been displayed until then. In this situation, it would be natural for A/V Wall 112, which has been displayed on the left until then, to be displayed on the back, as shown in FIG. 20. In this embodiment, however, A/V Wall 112 is displayed on the right where Application Wall 113 has been displayed until then.

This is for the following reason. If Application Wall 113 is displayed not on the left, but on the back as shown in FIG. 19, Application Wall 113 would disappear from display 51 and the user would not be able to view it. To have Application Wall 113 displayed in front from a situation shown in FIG. 19, it would be necessary for the user first to click Video Wall 111 which is displayed on the right so that Video Wall 111 moves to the front and so that Application Wall 113 moves to the right side, as shown in FIG. 17. Then, by further clicking Application Wall 113 in a situation shown in FIG. 17, Application Wall 113 is finally displayed in front, as shown in FIG. 20. In this case, clicking operation must be made twice.

This procedure is similar when A/V Wall 112, which is displayed on the back as shown in FIG. 20, is going to be displayed in front. In this case, Video Wall 111 is clicked in a situation shown in FIG. 20, so that Video Wall 111 moves to the front and so that A/V Wall 112 moves to the left as shown in FIG. 17. By further clicking A/V Wall 112, A/V Wall 112 is finally displayed in front as shown in FIG. 19.

Figure 21:
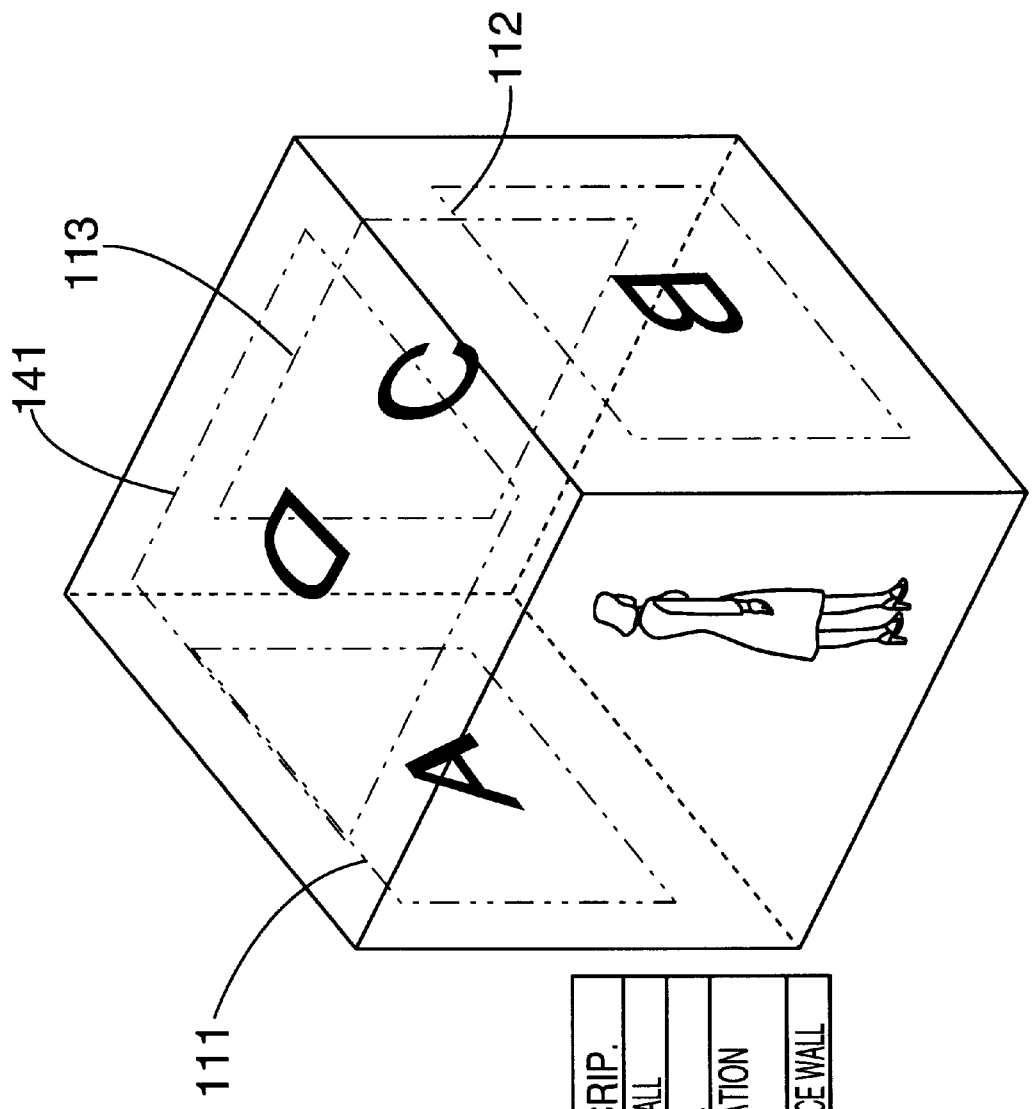

On the other hand, as shown in FIG. 18 or 21, if no fixed screen is arranged on the back, it becomes always possible to display one of the three sides in front by a single clicking so that operational performance is improved.

Figure 22:
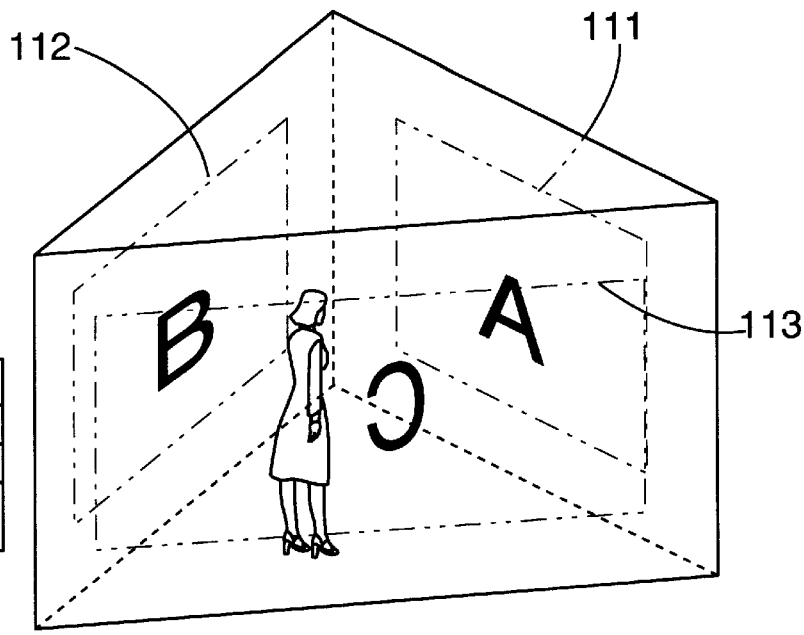

In this embodiment, though the Walls are arranged and displayed on the four sides, the actual process can be done as if each Wall is arranged on the three sides of a triangular prism, as shown in FIG. 22.

Therefore, as shown in FIG. 22, it is possible to display the images displayed on the three sides of an imaginary triangular prism as if they were seen from a view point inside the prism. However, by doing so, it becomes impossible to display the Walls of the right and left sides on display 51 which is two-dimensional. As shown in FIG. 4A, Video Wall 111 and A/V Wall 112 are displayed to constitute a right angle therebetween. Video Wall 111 and Application Wall 113 are also displayed to constitute a right angle therebetween. However, if the two Walls are displayed to have an acute angle therebetween, the user cannot recognize the image as three-dimensional because a range of human vision is not so wide. Therefore, it is preferable to utilize a display method as shown in FIGS. 17, 18 and 21.

In the above embodiment, when a Wall is displayed in front, portions of other fixed windows are displayed on the right and left. However, it is also possible that when Video Wall 111, for example, is displayed in front, A/V Wall 112 and Application Wall 113 are not displayed on the right and left.

Figure 23:
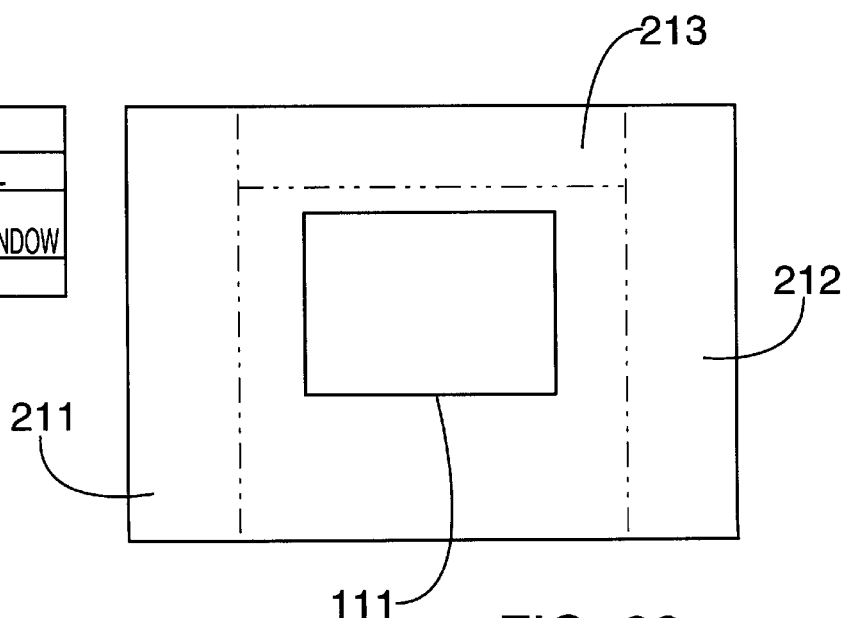
FIG. 23 shows another display example of Walls.

In the above embodiment, Net Space Wall 141 is usually not displayed. As shown in FIG. 4A, in a condition where the Walls on the three sides are displayed, when a certain position above the front Wall is clicked, Net Space Wall 141 is displayed, as shown is FIG. 10. As shown in FIG. 23, when certain area 213 above Video Wall 111 is clicked, Net Space Wall 141 becomes displayed at the center of the screen. When area 211 or 212 is clicked, A/V Wall 112 or Application Wall 113 can be arranged and displayed at the center of the screen.

Figure 24:
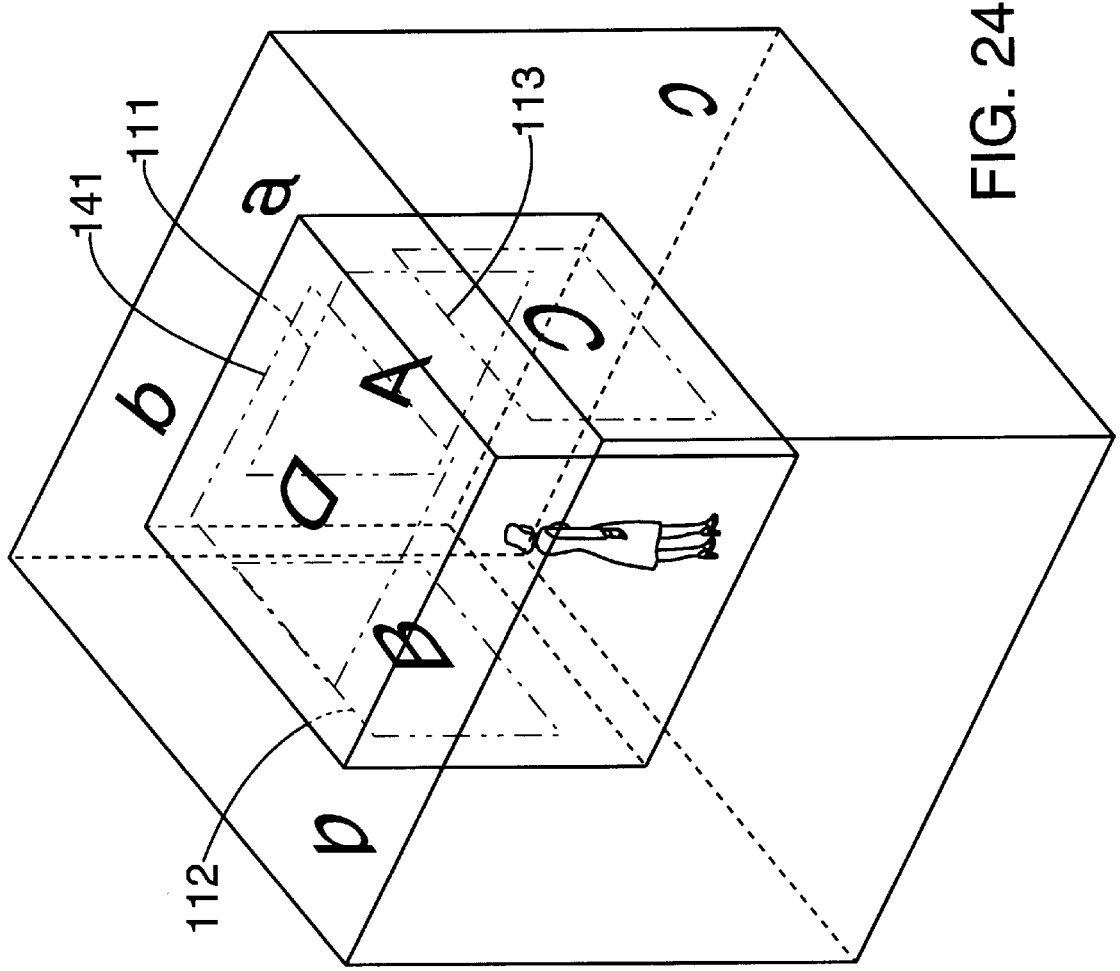
FIG. 24 is a drawing for explaining imaginary screens when a background image changes.

FIG. 24 shows another embodiment. In this embodiment, an outer rectangular parallelepiped for displaying a background image is arranged around an inner rectangular parallelepiped (including a cube) for displaying Walls. On the front, left, right and top faces of the outer rectangular parallelepiped, background images for the corresponding faces of the inner rectangular parallelepiped are arranged. For the convenience of explanation, in FIG. 24, these background images are shown by letters "a" to "d" corresponding to letters "A" to "D" which are the images on the inner rectangular parallelepiped. The background image shown by letter "a" is displayed behind the image shown by letter "A", the background image shown by letter "b" is displayed behind the image shown by letter "B", the background image shown by letter "c" is displayed behind the image shown by letter "C" and the background image shown by letter "d" is displayed behind the image shown by letter "D".

Because a background image corresponding to a wall which is displayed in front is displayed as a background image for display 51, the user can intuitively recognize from the background image which window the currently selected wall is so that operational performance is improved.

As described above, the background is displayed and three Walls 111 to 113 are displayed not totally covering the background image but leaving a part of the background image uncovered and further making the background image seen through, as shown in FIG. 4A. In addition, icons 121 to 129 constitute a part of the background image and are displayed as if floating and rotating in a three-dimensional space. Accordingly, the user is provided with a menu giving open-space impression.

Although no image is displayed on the bottom face of the rectangular parallelepiped in the above embodiments, it is possible to display an image on the bottom face. Although the present invention has been described above as applied to a personal computer, for example, the present invention can be also applied to other display control apparatus.

What is claimed is:

1. A method for selecting and running one of a plurality of application programs in a computer system, the computer system including a processor coupled to a memory, a display device and a user input device, the computer system further including an operating system that provides a graphical operating system control for selecting and running one of a plurality of application programs, wherein the method includes the steps of:

displaying a graphical navigation control for selecting and running one of a plurality of application programs, wherein the graphical navigation control is distinct from the graphical operating system control;

displaying the graphical operating system control concurrently with the display of the graphical navigation control;

accepting signals from the user input device to select an application program via the graphical navigation control;

accepting signals from the user input device to run the application program selected via the graphical navigation control;

accepting signals from the user input device to select an application program via the graphical operating system control; and accepting signals from the user input device to run the application program selected via the graphical operating system control, wherein the graphical navigation control comprises a plurality of visual walls, wherein a primary wall is centered in the middle of the display device, wherein secondary walls are arranged adjacent to the primary wall, wherein each wall includes one or more application programs that can be selected and run, the step of "accepting signals from the user input device to select an application program via the graphical navigation control" includes the substeps of determining which wall the selected application program resides on;

if the selected application program is contained on a secondary wall then making that containing secondary wall the primary wall by redisplaying the primary and secondary walls so that the containing secondary wall is in the center of the display device; and if the selected application program is contained on the primary wall then indicating that the selected application program is selected.

2. The method of claim 1, wherein the substep of "indicating that the selected application program is selected" includes running the selected application program.

3. The method of claim 1, wherein the graphical navigation control visually resembles a "room" where the point-of-view of a user is such that the user is standing in the room facing the primary wall, wherein secondary walls are present to the left and right of the point-of-view.

4. The method of claim 3, wherein each wall of the graphical navigation control contains application programs of a different type.

5. The method of claim 4, wherein a first one of the walls is an A/V Wall that contains application programs for the playback of image and sound files, wherein a second one of the walls is a Video Wall that displays the playback of an image file, wherein a third one of the walls is an Application Wall that handles selection of general application programs.

* * * * *